(12) United States Patent
Magne et al.

(10) Patent No.: US 6,639,681 B1
(45) Date of Patent: Oct. 28, 2003

(54) DEVICE FOR READING SPECTRAL LINES CONTAINED IN AN OPTICAL SPECTRUM

(75) Inventors: Sylvain Magne, Fontinay-aux-Roses (FR); Pierre Ferdinand, Houilles (FR); Gilles Grand, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/424,948

(22) PCT Filed: Jun. 3, 1998

(86) PCT No.: PCT/FR98/01118

§ 371 (c)(1),
(2), (4) Date: Mar. 13, 2000

(87) PCT Pub. No.: WO98/55835

PCT Pub. Date: Dec. 10, 1998

(30) Foreign Application Priority Data

Jun. 4, 1997 (FR) .............................. 97 06871

(51) Int. Cl.$^7$ ................................ G01B 9/02
(52) U.S. Cl. ........................... 356/478; 385/12
(58) Field of Search ..................... 396/478; 385/12; 250/227.19

(56) References Cited

U.S. PATENT DOCUMENTS

| | | | |
|---|---|---|---|
| 4,786,133 A | 11/1988 | Gidon et al. | |
| 4,996,419 A | 2/1991 | Morey | |
| 5,191,458 A | 3/1993 | Lyons et al. | |
| 5,426,297 A | 6/1995 | Dunphy et al. | ........ 250/227.23 |

FOREIGN PATENT DOCUMENTS

EP 0 275 795 A1 7/1988

OTHER PUBLICATIONS

US 2002/0114062 A1, "Optical Performance Monitoring for D/WDM Networks", Simard et al.*
U.S. patent application Ser. No. 09/380,346, filed Nov. 18, 1999, entitled "Device for Demultiplexing Spectrum Lines Contained in an Optical Spectrum,".
Clemens et al., "8–Channel Optical Demultiplexer Realized as SiO$_2$/Si Flat–Field Spectrograph," *IEEE Photonics Technology Letters*, vol. 6, No. 9, Sep., 1994, pp. 1109–1111.
Grand et al., "Réseau Blazé à Profil Trés Vertical en Silice Sur Silicium—Application au Multiplexage Pour Communications Optiques," LETI(CEA–Technologies Avancées) DOPT/CENG, 17 reu des Martyrs, 38054 Grenoble Cedex 9, France.
Verbeek et al., "Integrated Four–Channel Mach–Zehnder Multi–Demultiplexer Fabricated with Phosphorous Doped SiO$_2$ Waveguides on Si," *Journal Of Lightwave Technology*, vol. 6, No. 6, Jun. 1988, pp. 1011–1015.
Takahashi et al., "Transmission Characteristics of Arrayed Waveguide N x N Wavelength Multiplexer," *Journal Of Lightwave Technology*, vol. 13, No. 3, Mar. 1995, pp. 447–455.

(List continued on next page.)

Primary Examiner—Frank G. Font
Assistant Examiner—Phil Natividad
(74) Attorney, Agent, or Firm—Harness, Dickey & Pierce, P.L.C.

(57) ABSTRACT

This device comprises a device (DD) for demultiplexing these lines in terms of wavelength, a device (DM) for measuring, by filtering, the wavelengths of the demultiplexed lines, comprising, for each of these lines, a measuring channel (VM) provided with a filter and a reference channel (VR), and means (MP) for the photodetection, for each line, of the light intensity transmitted by the corresponding measuring and reference channels. The wavelength of each of these lines is determined by calculating the ratio of the intensities thus detected. Application to the monitoring of structures.

17 Claims, 10 Drawing Sheets

OTHER PUBLICATIONS

Okamoto et al., "Fabrication of 64 × 64 Arrayed–Waveguide Grating Multiplexer on Silicon," *Electronics Letters*, Feb. 2, 1995, vol. 31, No. 3, pp. 184–186.

Delisle et al., "Reduced–Size Low–Crosstalk PECVD Silica Phasar Using Widened Continuous Bends," LETI–CEA (Département de Microtechnologies), 17 rue des Martyrs, F–38054 Grenoble, Cedex 9, France, pp. 72–75.

Joseph W. Goodman, Stanford University, Department of Electrical Engineering, "Introduction to Fourier Optics," A MaGraw–Hill Classic Textbook Reissue, McGraw–Hill Publishing Company.

Seppo Honkanen, Nokia Research Center, Helsinki, Finland and Helsinki University of Technology, Espoo, Finland, "Ion–Exchanged Glass Waveguide Devices for Optical Communications," *Critical Reviews*, vol. CR53, pp. 159–179.

Ludwig Roβ, "Integrated Optical Components in Substrate Glasses," *Glastech. Ber.*, 62 (1989) Nr. 8, pp. 285–297.

Valette et al., "Si–Based Integrated Optics Technologies," *Solid State Technology*, Feb. 1989, pp. 69–74.

Hunziker et al., Institute of Quantum Electronics, Swiss Federal Institute of Technology, ETH Hoenggerberg, CH–8093 Zurich, Switzerland, Self–Aligned Optical Flip––Chip OEIC Packaging Technologies, pp. 84–91.

Grand et al., "New Method for Low Cost and Efficient Optical Connections Between Singlemode Fibres and Silica Guides," *Electronics Letters*, Jan. 3, 1991, vol. 27, No. 1, pp. 16–18.

Ainslie et al., BT Laboratories, Martlesham Heath, Ipswich IP5 7RE, United Kingdom, Photosensitive Glass Integrated Optical Devices, pp. 235–249.

Maxwell et al., "UV Written 1·5µm Reflection Filters in Single Mode Planar Silica Guides," *Electronics Letters*, Oct. 22, 1992, vol. 28, No. 22, pp. 2106–2107.

Hill et al., "Bragg Gratings Fabricated in Monomode Photosensitive Optical Fiber by UV Exposure Through a Phase Mask," *Applied Physics Letters* 62 (10), Mar. 8, 1993, pp. 1035–1037.

Yasuji Ohmori, NTT Opto Electronics Laboratories, Tokai, Ibaraki 319–11, Japan, "Passive and Active Silica Waveguides on Silicon," pp. 19–26.

Valette et al., "Silicon–Based Integrated Optics Technology for Optical Sensor Applications," *Sensors And Actuators*, A21 A23 (1990) pp. 1087–1091.

Izutsu et al., "Operation Mechanism of the Single–Mode Optical–Waveguide Y Junction," *Optics Letters*, vol. 7, No. 3, Mar. 1982, pp. 136–138.

Rowe et al., "High–Reflectivity Surface–Relief Gratings in Single–Mode Optical Fibres," *IEE Proceedings*, vol. 134, Pt. J, No. 3, Jun. 1987, pp. 197–202.

Bilodeau et al., "Photosensitization of Optical Fiber and Silica–on–Silicon/Silica Waveguides," *Optics Letters*, Jun. 15, 1993, vol. 18, No. 12, pp. 953–955.

Kashyap et al., "Novel Method of Producing All Fibre Photoinduced Chirped Gratings," *Electronics Letters Online No.; 19940669*, Apr. 18, 1994, ©*IEE* 1994.

Farries et al., "Very Broad Reflection Bandwidth (44nm) Chirped Fibre Gratings and Narrow Bandpass Filters Produced by the Use of an Amplitude Mask," *Electronics Letters Online No. 19940609*, May 3, 1994, ©*IEE* 1994.

Meltz et al., "Formation of Bragg Gratings in Optical Fibers by a Transverse Holographic Method," *Optics Letters*, Aug. 1, 1989, vol. 14, No. 15, pp. 823–825.

Kashyap et al., "Laser–Trimmed Four–Port Bandpass Filter Fabricated in Single–Mode Photosensitive Ge–Doped Planar Waveguide," *IEEE Photonics Technology Letters*, vol. 5, No. 2, Feb. 1993, pp. 191–194.

Baumann et al., "Compact All–Fiber Add–Drop–Multiplexer Using Fiber Bragg Gratings," *IEEE Photonics Technology Letters*, vol. 8, No. 10, Oct. 1996, pp. 1331–1333.

Ferdinand et al., "Mine Operating Accurate STABILity Control with Optical Fiber Sensing and Bragg Grating Technology: The Euoroean BRITE/EURAM STABILOS Project," *Journal Of Lightwave Technology*, vol. 13, No. 7, Jul. 1995, pp. 1303–1313.

Melle et al., "A Passive Wavelength Demodulation System for Guided–Wave Bragg Grating Sensors," *IEEE Photonics Technology Letters*, vol. 4, No. 5, May 1991, pp. 516–518.

Mestric et al., Alcatel Alsthom Corporate Research Centre, Alcatel–Alsthom Recherche, Route de Nozay, 91460 Marcoussis, France, "Up to 16 Channel Phased–Away Wavelength Demultiplexers on Inp with −20 dB Crosstalk," pp. 264–267.

Davis et al., "All–Fibre Bragg Grating Strain–Sensor Demodulation Technique Using a Wavelength Division Coupler," *Electronics Letters*, Jan. 6, 1994, vol. 30, No. 1, pp. 75–77.

Ball et al., "Single– and Multipoint Fiber–Laser Sensors," *IEEE Photonics Technology Letters*, vol. 6, No. 2, Feb. 1993, pp. 267–270.

Davis M A et al: "Matched–Filter Interrogation Technique For Fibre Bragg Grating Arrays" Electronics Letters, vol. 31, No. 10, May 11, 1995, pp. 822/823.

* cited by examiner

DEVICE FOR READING SPECTRAL LINES CONTAINED IN AN OPTICAL SPECTRUM

TECHNICAL FIELD

The present invention relate to a device for reading spectral lines contained in an optical spectrum.

It finds applications notably in the field of optical communications.

The invention applies particularly to networks of sensors with optical fibres.

These comprise notably networks of deformation sensors with optical fibres and very often photo-inscribed Bragg gratings constituting the components transducing deformation (or even pressure or temperature).

One of the first architectures of networks to have been published uses an optical source with a spectral width greater than the spectral band containing the spectra of the Bragg gratings and sequentially analyses the wavelengths reflected by the different sensors (demultiplexing in terms of wavelength and then spectral analysis of the different signals).

In this regard, reference should be made to documents (1) to (4) which, like the other documents cited below are set out at the end of the present description.

Such networks of sensors can be used for monitoring structures in the following fields: building, civil engineering, transportation, aeronautics and aerospace.

PRIOR ART

Four techniques are known for effecting integrated optics demultiplexing: a first technique using an engraved grating, a second technique using Mach-Zehnder interferometers, a third technique using an array of microguides or PHASAR (standing for PHASe-ARray), and a fourth technique using balanced Mach-Zehnder interferometers or 100% couplers with a Bragg grating photo-inscribed identically on the two arms ("ADD-DROP multiplexer").

The first technique uses the diffraction of light by a concave grating (with a circular or plane exit field) engraved and blazed to a high degree.

Vertical engraving is possible in the case of silica on silicon guides and can attain a depth of 25 $\mu$m.

In this regard, document (6) should be consulted.

The demultiplexing component then consists of an input fibre connected to a planar guide sending the light in the direction of an engraved diffraction grating.

In the case of a grating with a circular exit field, the incident light and the diffracted light, refocused at different angular incidences, are located on the Rowland circle.

In the case of a plane field grating (see document (6)), the stigmatic points dispersed in terms of wavelength are aligned on a straight line orthogonal to the reflected field.

As the grating functions by reflection, it is metallised.

The engraving profile of the grating can consist of a set of ellipses, as taught by document (7).

The diffracted beam is refocused on monomode guides having for example a mode diameter of 9 $\mu$m and a spacing of 16 $\mu$m, as taught by document (6), or on photodiodes forming an array as taught by document (5).

The network preferably functions at a high degree of diffraction (ranging from 4 in document (6) to 50 in document (5)) with the intention of effecting a high-density demultiplexing (for telecommunications).

The second technique is based on putting several interferometers of the Mach-Zehnder type in series, which are all unbalanced with regard to their optical paths, with a characteristic imbalance value.

In this regard, document (8) should be consulted.

For a demultiplexer with four channels, two interferometers are for example used, whose imbalances are equal respectively to $\Delta L_1$ and $\Delta L_2 = \Delta L_1 + \lambda/_{4N}$, and a third interferometer whose imbalance $\Delta L_3$ is equal to $2.\Delta L_1$ (typically around 50 $\mu$m to 100 $\mu$m) in order to obtain an inter-channel separation of 7.5 nm to 1,550 nm, N being effective index of the mode.

The third technique uses an optical phase-array which consists of a set of parallel monomode dephasing guides connecting two plane input and output guides by means of circular interfaces.

In this regard, document (9) should be consulted.

Input guides and output guides are connected to the other circular interfaces of the plane guides.

The light injected by any one of the input guides lies in the input guide plane and covers all the dephasing guides situated at the interface.

From one dephasing guide to another, there is a constant difference in length so that the light beams emerging from the output guide plane interfere as if they were reflected by an inclined concave diffraction grating.

The offset in the optical path caused by the dephasing guides produces the same effect as an inclination of the wave front with respect to the interface.

The PHASAR, which functions by transmission, must behave like a grating with a concave diffraction of a very high degree (approximately 50 to 100) and with a high multiplexing capacity.

In this regard, document (10) should be consulted.

The greater the number of dephasing guides, the better the spectral resolution.

For example, in document (11), 60 dephasing guides are used.

In order to cancel out the polarisation dependency of this circuit, one possible solution is to insert a half-wave plate in the middle of the optical circuit formed by the dephasing guides.

The fourth technique uses balanced Mach-Zehnder interferometers or 100% couplers with a Bragg grating photo-inscribed in an identical fashion on the two arms. The light is injected at the port 1 and emitted at the port 3 (100% coupling) for all the distinct wavelengths of the Bragg wavelength; the light at the Bragg wavelength is reflected selectively at the port 2. In this regard, document (29) should be consulted, from which all the references in the description of the fourth technique, given in the present section, are derived.

Three kinds of material are used for producing the components used in the above four techniques:

glass, silica on silicon and semiconductors of the InP type.

In particular, engraved gratings and PHASARs have been produced in integrated optics on silicon whilst demultiplexers with interferometers have been produced in integrated optics on silicon and on glass.

The components by means of which these four known techniques are implemented are only demultiplexers which serve merely to separate different spectral contributions.

These components do not make it possible to determine the Bragg wavelengths directly with the required precision.

In addition, these techniques require a compromise between cross-talk and spectral space occupied.

Cross-talk, that is to say the light coupling between the outputs, must be minimised since it contributes to falsifying the wavelength measurements.

Typically, a cross-talk of −25 dB to −30 dB is sought and the spectral occupation is derived accordingly.

In the case of a diffraction grating in integrated optics on silicon, the light coupling between the outputs is caused by the diffusion in the guide (because of engraving imperfections) and by the coupling between the output guides when these are two close together.

Between the centres of two adjacent spectral channels, the cross-talk is typically around −20 dB to −35 dB whilst it is no more than −10 dB to −15 dB at the intersection of the transfer functions corresponding to these channels (at half the spectral period).

In this case, a spectral space unoccupied by a transducer is therefore necessary so as to guarantee the minimum of cross-talk necessary.

Typically, this cross-talk is achieved with a spectral occupation of around 0.8 nm on 2 nm of period (see documents (5) and (6)).

The characteristics of cross-talk and occupied space of the PHASAR and engraved grating are equivalent.

Typically, a cross-talk better than −30 dB is achieved in the case of document (11), for a spectral occupation of 0.8 nm and a period of 2 nm, with 60 dephasing guides and a degree of diffraction equal to 60.

In the case of Mach-Zehnder interferometers, the cross-talk depends on the accuracy of adjustment of the separation couplers (3 dB couplers).

By way of example, in document (8) a demultiplexer is described which consists of three interferometers formed from 3.1 dB couplers (instead of 3 dB) and which is characterised by a cross-talk of approximately −20 dB.

In document (4) there is also proposed a demultiplexer which includes a device for collimating the light to be analysed and a series of cascaded bandpass filters associated with photodetectors.

The main drawback of this demultiplexer is being designed to operate in free space.

Because of this, the reproducibility and reliability of the measurements and the robustness and integration of this demultiplexer are insufficient for an application to microsystems.

In addition, the minimum cross-talk which it is possible to obtain with this demultiplexer depends on the reflection of the bandpass filters used (which typically have antireflection deposits of −20 dB) and also depends greatly on the polarisation of the light analysed (the filters are oriented at 45°).

Finally, such a demultiplexer does not lend itself to mass production compatible with the requirements of the market for industrial sensors.

DISCLOSURE OF THE INVENTION

The present invention provides for a device (preferably integrated) for reading spectral lines contained in an optical spectrum, this device comprising demultiplexing and measuring devices (preferably integrated) and having a low response time (large passband in terms of frequency) and optimised manufacturing cost and "flexibility".

This reading device then makes it possible to design Microsystems for measuring deformations which function in real time, in a wide range of frequencies extending up to ultrasonic frequencies.

The principle of operation of this reading device uses techniques developed for optical telecommunications but, unlike what was done in this latter field, the present invention uses not only demultiplexing of different channels (corresponding for example to different sensors) but also allows the measurement of wavelengths corresponding to these channels.

The present invention resolves the problem of design of a spectral line reading device which is able to have a high multiplexing capacity to permit the simultaneous observation of a large number of transducers, typically eight or more, with a very low light coupling (cross-talk) between its outputs, typically around −25 dB to −30 dB, which is able to have a large passband in terms of frequency, around 100 kHz for example, which is able to be integrated on a planar substrate, which has great flexibility in manufacture (since it permits the adjustment of the tuning wavelengths).

Precisely, the object of the present invention is a device for reading spectral lines which are contained in an optical spectrum and are liable to fluctuate respectively in given spectral domains, this device being characterised in that it comprises:

a device for demultiplexing these spectral lines in terms of wavelength, this demultiplexing device having an input intended to receive the optical spectrum and outputs intended to supply respectively the demultiplexed spectral lines, a device for measuring, by filtering, the respective wavelengths of the demultiplexed spectral lines, comprising, for each of these lines, a measuring channel provided with a filter and a reference channel, and means of photodetection, for each spectral line, of the light intensities respectively transmitted by the corresponding measuring and reference channels, so as to be able to determine the wavelength of this line by calculating the ratio of the intensities thus detected.

The device which is the object of the invention is thus an optical device able to be integrated on a planar substrate making it possible to obtain a set of electrical signals representing the wavelengths of the spectral lines (each of these lines being sufficiently separated from the adjacent spectral lines).

These spectral lines can for example result from the reflections of transducing Bragg gratings photo-inscribed on a sensitive monomode optical fibre, subjected to stresses or to variations in temperature and pressure.

More generally, these lines can result from transducers which generate spectral lines whose positions it is sought to determine.

The originality of the device which is the object of the invention lies notably in the fact that it incorporates (preferably on one and the same substrate) a demultiplexing part and a filtering/measuring part.

The device for demultiplexing in terms of wavelength can be a demultiplexing device with an engraved grating or a network of micro-guides (or PHASAR, already considered above).

However, according to a preferred embodiment of the device which is the object of the invention, the demultiplexing device comprises:

an energy separator, having an input which is intended to receive the optical spectrum, and a plurality of outputs which are capable of supplying respectively fractions of the light energy of the optical spectrum, and a plurality of wavelength-selective light reflectors which are respectively connected to the outputs, each wavelength-selective light reflector having a wavelength passband which contains the spectral region associated with one of the lines and therefore reflecting only this line, each selective reflector being connected to an optical waveguide intended to propagate the line reflected by this reflector.

It is possible to use an energy separator of a known type, for example of the type sold by Corning. This energy separator can be a set of separating junctions mounted in cascade, that is to say in a tree (their mounting is as a tree structure).

Each separating junction can be multimode but is preferably monomode notably when the optical spectrum which is to be demultiplexed is conveyed by a monomode optical fibre, connected to the input of the device.

These separating junctions can be couplers, for example 3 dB couplers (couplers which are such that each of their two output channels transports half of the incident light energy).

However, this makes it necessary to precisely adjust the coupling length and the interval between the coupled waveguides of such couplers according to the wavelength.

This is why, in the present invention, it is preferable to use separating junctions consisting of Y junctions.

These Y junctions have the advantage of being achromatic and independent of the polarisation.

One advantage of the preferred embodiment of the device which is the object of the invention lies in the excellent rejection in terms of wavelength, which ensures very low cross-talk (spectral profile of reflection in square waves), and in the very great "flexibility" in manufacture.

Compared with the device described in document (4), the device which is the object of the invention has the advantage of using no collimation device and allows integration of all its basic components (filters, separators etc), the light remaining guided at all points in the device.

The latter thus makes it possible to resolve the problems posed above, namely achieving a high multiplexing capacity with very low light coupling between outputs (very low cross-talk) with a large passband in terms of frequency, whilst ensuring a cost, integration, robustness and flexibility in manufacture (wavelength adjustment) which are compatible with the requirements of the instrumentation and sensor market.

In the preferred embodiment of the device which is the object of the invention, the selective reflectors can comprise Bragg gratings. These Bragg gratings can be photo-inscribed or photo-engraved.

In addition, these Bragg networks can be variable-period gratings (chirped gratings).

It is also possible to use gratings with a fixed period and maximum reflectivity ("saturated"), which is achieved for example for photo-inscription under very high flux (so as to broaden their spectral response).

The filters respectively associated with the measuring channels can be Chirped Bragg gratings or filters with dielectric multilayers different from each other or filters with dielectric multilayers identical to each other or Mach-Zehnder interferometers.

The demultiplexing device and device for measuring by filtering can respectively be integrated on two substrates which are connected by means of optical fibres intended to transmit the demultiplexed lines from the demultiplexing device to the device for measuring by filtering.

These two substrates can be made of glass or silicon, or III–V semiconductor (such as for example AsGa or InP).

However, the demultiplexing device and the device for measuring by filtering are preferably integrated on the same substrate, which can be made of glass or silicon, or from III–V semiconductor.

According to a preferred embodiment of the invention, which is highly integrated, the demultiplexing device, the device for measuring by filtering and the means for the photodetection of spectral lines are integrated in the same substrate made of silicon or III–V semiconductor.

The device which is the object of the invention can also comprise an optical fibre which is optically coupled to the input of the demultiplexing device and which is intended to bring the optical spectrum to this entry.

BRIEF DESCRIPTION OF THE DRAWINGS

The present invention will be more clearly understood from a reading of the description of example embodiments given below, purely as an indication and in no way limitative, referring to the accompanying drawings, in which.

DETAILED DISCLOSURE OF PARTICULAR EMBODIMENTS

Figure 1A:
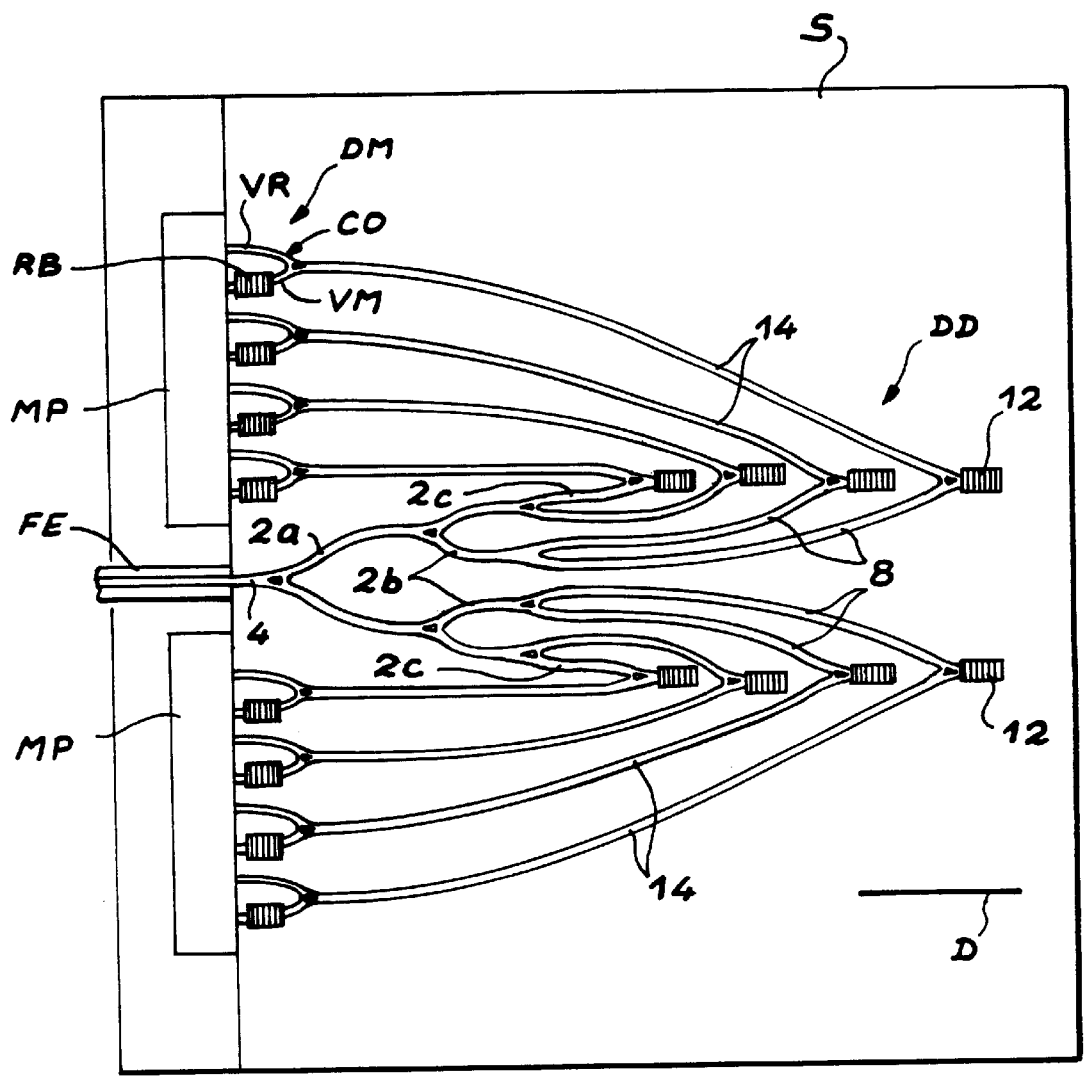
FIGS. 1A to 1D are schematic plan views of particular embodiments of the device which is the object of the invention, used in the same demultiplexing device with Bragg gratings, FIGS. 1B to 1D showing this demultiplexing device only partially.

Twelve particular embodiments of the device which is the object of the invention are considered below, schematically depicted in plan view in FIGS. 1A to 3D.

Each of these embodiments is intended for determining the wavelength of a plurality of spectral lines, for example eight spectral lines, which form an optical spectrum and are able to fluctuate respectively within a given spectral region.

Each of these particular embodiments comprises:

a device DD for demultiplexing of the spectral lines in terms of wavelength, this demultiplexing device having an input intended to receive the optical spectrum and outputs intended to supply respectively the demultiplexed spectral lines, a device DM for measuring, by filtering, the respective wavelengths of the demultiplexed spectral lines, comprising, for each of these lines, a measuring channel VM provided with a filter and a reference channel VR, means MP for the photodetection, for each spectral line, of the light intensity respectively transmitted by the corresponding measuring and reference channels, and an external optical fibre FE which transports the light containing the different spectral lines and which is optically coupled to the input of the device DD.

Advantageously, the devices DD and DM are integrated on the same substrate S.

The demultiplexing device DD can be formed by:

a succession of monomode junctions Y associated with Bragg gratings (FIGS. 1A, 1B, 1C, 1D) or an engraved grating (FIGS. 2A, 2B, 2C, 2D) or a PHASAR (FIGS. 3A, 3B, 3C, 3D) giving three particular embodiments.

The device DM for measuring by filtering can comprise:

chirped Bragg gratings each associated with a measuring channel (FIGS. 1A, 2A, 3A) or filters with dielectric multilayers which are identical for all the measuring channels (FIGS. 1B, 2B, 3B) or filters with dielectric multilayers which are different from each other (FIGS. 1C, 2C, 3C) or Mach-Zehnder interferometers (FIGS. 1D, 2D, 3D), giving four particular embodiments.

There are therefore indeed, in total, the 3×4=12 particular embodiments of the device which is the object of the invention.

Three manufacturing technologies which can be used are the technology of integrated optics on glass, the technology of integrated optics on silicon and the technology of III–V semiconductors (AsGa for wavelengths of around 0.8 µm and InP for wavelengths of around 1.3 µm).

These three technologies are of interest since they lend themselves well to a manufacturing process on a small or medium scale, and the substrates can be made photosensitive (glass, silicon) or photo-engraved (III–V semiconductor).

The devices in FIGS. 1A to 3D can be produced in all the technologies with the exception of FIGS. 2A to 2D, which are not applicable to the technology of integrated optics on glass.

Advantageously, all the dielectric guides which comprise the devices of FIGS. 1A to 3D are monomode for the optical excitation spectrum.

The external fibre FE is welded or connected to an optical circuit, not shown, which incorporates one or more sensitive optical fibres.

It thus constitutes the optical interface with the outside environment (accessible to the final user).

Advantageously, this optical fibre FE is monomode at the wavelength of use (typically 1,300 nm, 1,550 nm or 820 nm).

The connection between fibre and entry guide of the device DD can be provided by the groove technique ("V-groove").

In this regard, reference should be made to documents (15), (16), (18) and (19).

The fibre is generally connected to the guide by laser welding.

This operation is performed by certain companies, such as Newport Co.

Advantageously, the photodetection means MP are formed by a set of photodiodes or an array of photodiodes.

Arrays such as those which are sold by the company Centronics can be used.

A large passband in terms of frequency (100 kHz) can be achieved by causing the photodiodes to operate in photoconductor mode and inserting them in an electronic circuit of the transimpedence type for example.

Alternatively, in the case of a technology of optics integrated on silicon, the photodiodes can be directly incorporated into the circuit.

In this regard, reference should be made to documents (15) and (16).

As has been seen, the optical fibre FE serves as an interface with the measuring fibre or fibres of the user.

An example of a measuring fibre is a sensitive fibre on which transducing Bragg gratings have been photo-inscribed (stresses, temperature).

In this regard, reference should be made to documents (1), (2) and (3).

According to these documents, the spectral behaviour equation for a Bragg grating inscribed in a standard germanosilicate fibre is written:

$$\Delta\lambda/\lambda = 0.78 \times \epsilon + 7.4 \times 10^{-6} \times \Delta T - 5.18 \times 10^{-6} \times \Delta P$$

In this formula, $\epsilon$ represents a microdeformation and $\Delta T$ (in degrees) and $\Delta P$ (in MPa) correspond respectively to the temperature difference and to the pressure difference.

For all the embodiments, there will be considered by way of example a deformation measurement range of 1000 µε (a microdeformation (µε) corresponding to a relative elongation of 1 µm/m).

The corresponding spectral difference is approximately 1 nm at a working wavelength of 1,300 nm.

Likewise, for a temperature range of 100° C., the spectral difference caused by the temperature is 1 nm.

The corresponding measuring range is then chosen so as to be equal to 3 nm for each measurement transducing Bragg grating.

By way of example, all the transducing Bragg gratings are each spaced apart by 6 nm in order to guarantee a cross-talk of approximately −30 dB.

For an excitation source approximately 48 nm wide at mid-height, this corresponds to a multiplexing of 8 Bragg transducers on the measurement line.

Figure 4:
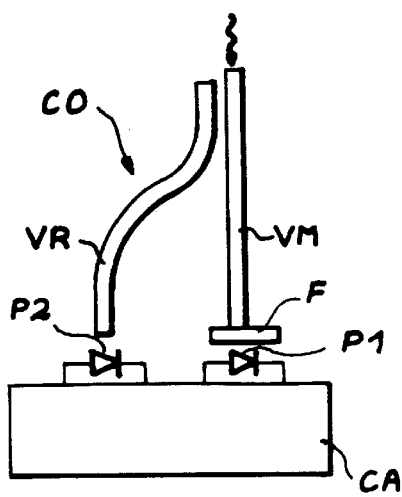
FIG. 4 illustrates schematically the principle used in the present invention for determining a wavelength by means of an optical filter.

The technique of measuring the wavelengths is explained below with reference to FIGS. 4 and 5.

Each demultiplexed spectral line is sent to the input branch of an optical coupler Co having two output branches which respectively constitute a measuring channel VM and a reference channel VR.

It is a case of an optical coupler whose degree of separation is stable (notably with respect to temperature).

The reference channel comprises an optical filter F (wavelength-selective element) with a known response and having a high spectral transition.

In this regard document (30) should be consulted.

The filter F is followed by a photodetector P1 which supplies an electrical signal s1 representing the light filtered by this filter.

Another photodetector P2 is placed following the reference channel and supplies an electrical signal s2 representing the light transmitted by the latter.

For reasons of overlap of spectra and identification of transducers, as many pairs of photodetectors are required as there are lines to be observed (and therefore, typically, Bragg transducers on the measuring line).

The ratio s1/s2 can be determined electronically by means of an analogue card CA which comprises an analogue divider (using for example logarithmic and antilogarithmic amplifiers) and a shaper for transforming this signal into a signal proportional to the required wavelength.

This ratio can also be determined digitally by a computer after conversion of the signals s1 and s2 in digital form by means of an analogue to digital acquisition card.

The spectral line of a Bragg transducer is well approximated by a Gaussian profile centred on a wavelength $\lambda i$, which it is wished to measure, and with a characteristic width $\Delta\lambda$ (and therefore with a width at mid-height $2.(\ln 2)^{1/2}.\Delta\lambda$).

If, for a wavelength $\lambda$ close to $\lambda i$, the transmission of the filter, is written A. $(\lambda-\lambda 0)$, the equation linking the centre wavelength $\lambda i$ of the line to the ratio s1/s2 measured is written:

$$s1/s2 = T(\lambda i) = A\left[\lambda i - \lambda 0 + \frac{\Delta\lambda}{2\cdot\sqrt{\pi}}\right]$$

where A and $\lambda 0$ are two parameters characteristic of the filter.

It can be seen then that $\lambda i$ can be calculated from s1/s2.

Figure 5:
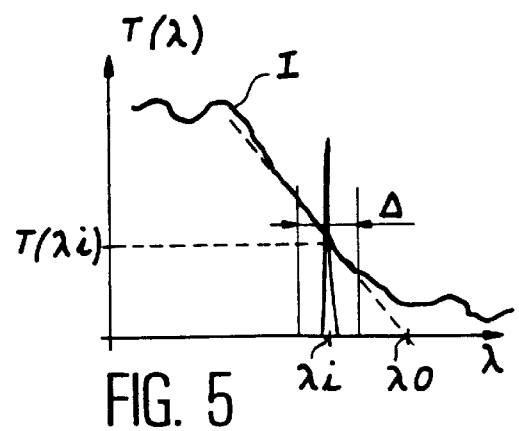
FIG. 5 depicts the spectral response of this filter, comprising a linear part.

FIG. 5 depicts the variations in the transmission $T(\lambda)$ of the filter, expressed for example as a percentage, as a function of the wavelength $\lambda$.

The spectral width $\Delta$ has been depicted, within which the line $\lambda i$ can vary.

The rectilinear part I of $T(\lambda)$ is substantially contained in a straight line whose slope is A and which intersects the axis of the $\lambda$ values at $\lambda 0$.

The principle of the spectral filtering for each of the four types of filters which can be used for the device for measuring by filtering is detailed below.

Reference should be made to FIGS. 6A, 6B, 6C and 6D, which correspond respectively to the use of chirped Bragg gratings, to the use of filters with dielectric multilayers which are identical for all the measuring channels, to the use of filters with dielectric multilayers which are different for the measuring channels and to the use of Mach-Zehnder interferometers.

FIGS. 6A to 6D depict the variations in the various spectral responses T (expressed as a percentage) as a function of the wavelength $\lambda$ (expressed in nanometres).

In these FIGS. 6A to 6D, the spectrum of the transducing Bragg gratings can also be seen, which comprises the eight spectral lines whose centre wavelengths are respectively denoted $\lambda 1$ to $\lambda 8$.

Figure 6A:
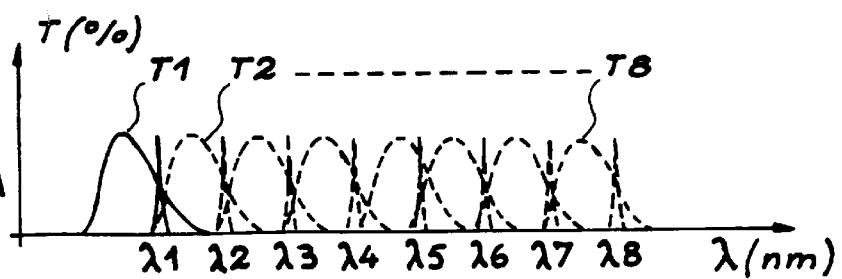
FIGS. 6A to 6D depict the spectral responses of various filters which can be used in the present invention.

In FIG. 6A there can be seen the respective spectral responses of the eight measuring Bragg gratings which are respectively denoted T1 to T8 and correspond respectively to the spectral lines $\lambda 1$ to $\lambda 8$ which it is wished to determine.

These measuring Bragg gratings each have a spectral response which is linear around the wavelength of the corresponding transducing Bragg grating.

Figure 6B:
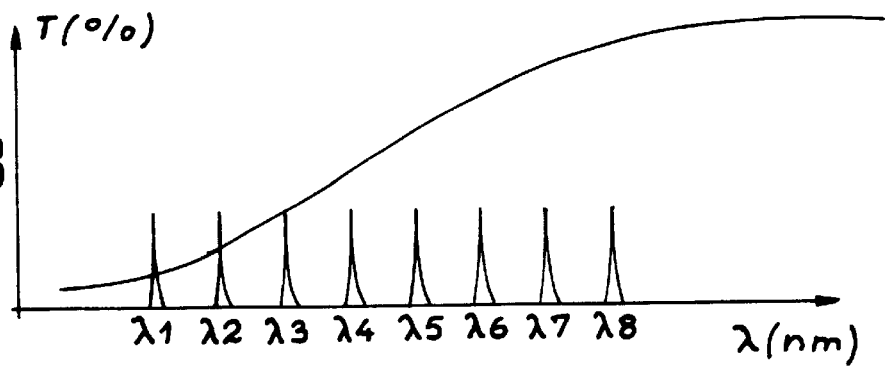

In FIG. 6B the spectral response TS common to all the filters with identical dielectric multilayers can be seen (high-pass filters in the example shown).

Figure 6C:
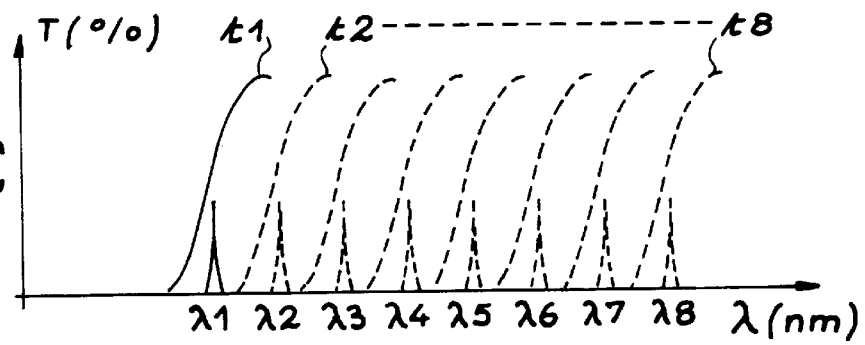

There can be seen in FIG. 6C the respective spectral responses t1 to t8 of the eight filters with different dielectric multilayers, for example high-pass, corresponding respectively to the spectral lines $\lambda 1$ to $\lambda 8$.

Figure 6D:
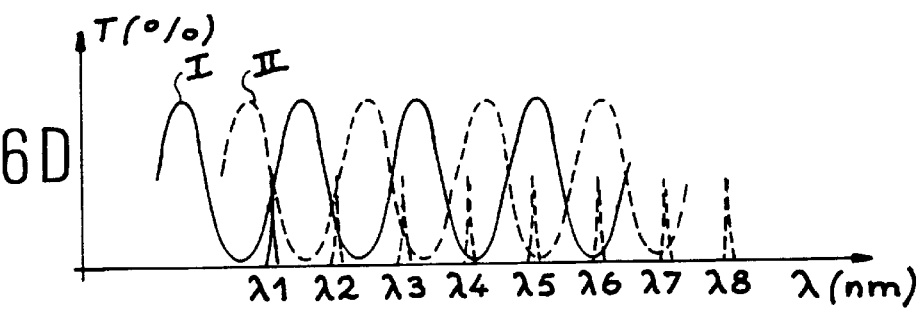

There can be seen in FIG. 6D the spectral response I of the Mach-Zehnder interferometer associated with the transducer supplying the spectral line with the centre wavelength $\lambda 1$.

The spectral response II of the Mach-Zehnder interferometer associated with the transducer supplying the spectral line with the centre wavelength $\lambda 2$ can be seen in dotted lines.

The other spectral responses corresponding respectively to the wavelengths $\lambda 3$ to $\lambda 8$ are not shown.

These interferometers have spectral periods which range from a few nanometres to a few tens of nanometres.

The demultiplexing device DD forming part of the devices of FIGS. 1A to 1D comprises energy separating junctions 2a, 2b, 2c which are cascaded.

The set of these separating junctions has an input 4, which is coupled to the fibre FE, and a plurality of outputs 8 which are able to supply respectively fractions of the light energy of the optical spectrum.

These separating junctions are chosen so as to be monomode when this fibre FE is monomode.

In the example shown, given that it is wished to separate eight spectral lines, seven cascaded separating junctions are used (see document (13)), namely one junction referenced 2a, two junctions referenced 2b and four junctions referenced 2c.

There are thus eight outputs 8 for all these separating junctions.

Y junctions are preferably used as separating junctions.

A Y junction consists of an input guide and two output guides forming an angle (typically a few degrees).

It can be seen in FIGS. 1A to 1D that the input branch of the junction 2a is optically coupled to the optical fibre FE and constitutes the input 4 of the set of junctions.

The two output branches of this junction 2a are respectively coupled to the input branches of the two junctions 2b.

Each of the output branches of these junctions 2b is itself coupled to the input branch of one of the four junctions 2c.

The eight output branches of these junctions 2c constitute the outputs 8 of the set of junctions and are respectively coupled to eight Bragg gratings 12.

Each of these Bragg gratings 12 forms a wavelength-selective light reflector.

This light reflector has a wavelength passband which contains the spectral region in which one of the eight spectral lines is liable to fluctuate.

This Bragg grating therefore reflects only this line.

Each of the Bragg gratings 12 is not only coupled on one side to one of the outputs of the set of junctions 2a, 2b, 2c but also coupled on the same side to an optical wave guide 14 which is intended to propagate the light corresponding to the demultiplexed line, reflected by this Bragg grating.

Figure 1B:
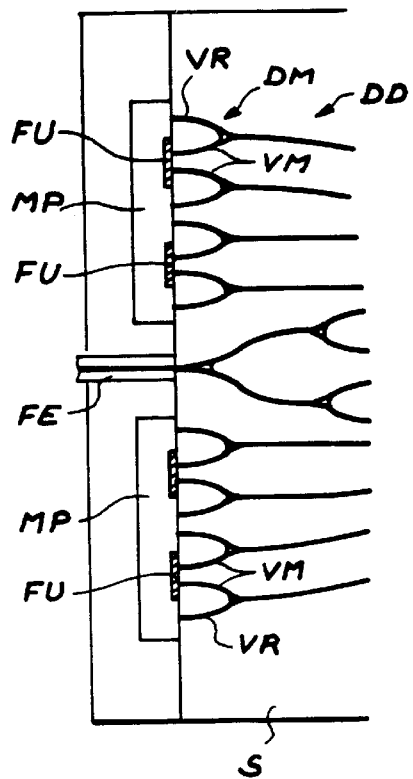
Figure 1C:
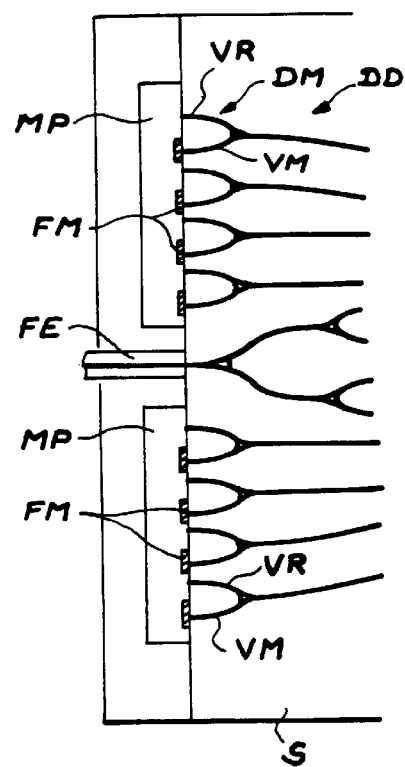

In the case of FIGS. 1A, 1B and 1C, each waveguide 14 is coupled to the input branch of the corresponding coupler CO forming part of the measuring device DM.

In the case of FIG. 1A, the output branch VM of this coupler carries a chirped Bragg grating RB (serving as a filter).

In the case of FIG. 1B, the output branches VM end at filters with identical dielectric multilayers FU, each filter FU being common to two adjacent branches VM in the example shown.

In the case of FIG. 1C, the output branches VM end at filters with dielectric multilayers FM which are different from each other.

Figure 1D:
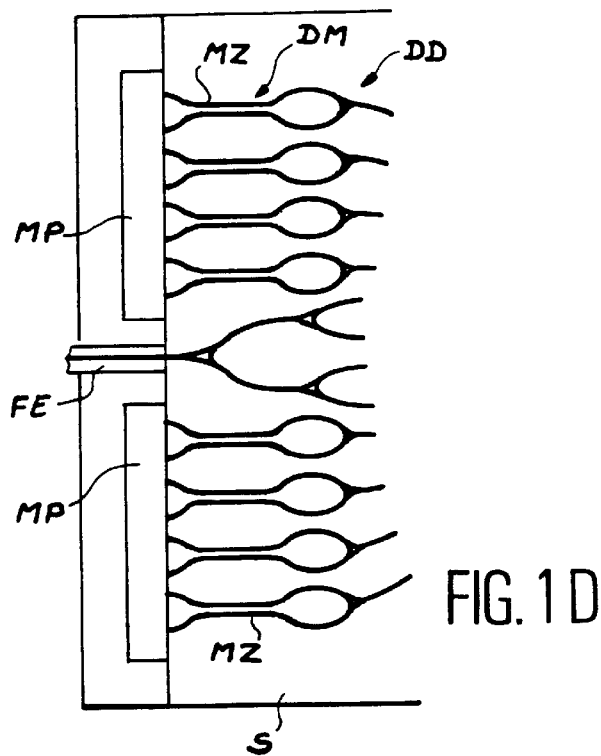

In the case of FIG. 1D, each guide is connected to the two input branches of the corresponding Mach-Zehnder interferometer MZ and the two output branches thereof (comparable to the two output branches of a coupler CO) end respectively at the two associated photodiodes (not shown) forming part of the means MD.

The substrate S is for example made of glass or silicon for reasons of convenience of manufacture of the Y junctions and Bragg gratings.

It should be stated that the vertical and horizontal scales of FIGS. 1A and 1D are different.

Purely as an indication and in no way limitatively, the Bragg gratings 12 extend in the same direction D and the dimension in FIGS. 1A to 1D in this direction is around 70 millimetres whilst, in a direction perpendicular to the previous one, the dimension is around 5 millimetres.

It should be stated that the light energy which arrives at each junction Y through the input branch thereof is situated half in one of the output branches of this junction and half in the other output branch.

On the other hand, the light energy appearing in an output branch of a Y junction is only half transmitted to the input branch of the following junction.

The remainder of this energy is transmitted to the substrate S.

In this regard, reference should be made to document (20).

For the demultiplexer with eight output channels of FIGS. 1A to 1D, the percentage of the incident light energy present in each optical wave guide 14 after reflection by the corresponding demultiplexing Bragg grating 12 is around 3% of this incident energy, the attenuation thus being around −15 dB.

Figure 7:
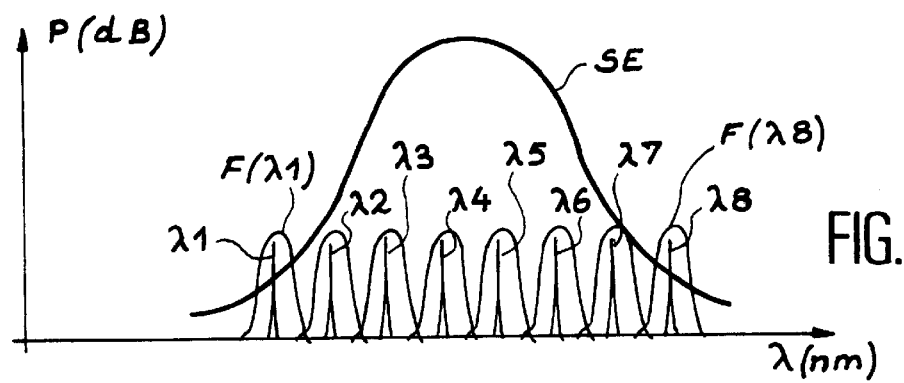
FIG. 7 illustrates schematically the principle of the spectral demultiplexing used in the invention.

FIG. 7 illustrates schematically the operating principle of the wavelength demultiplexing device of FIGS. 1A to 1D.

The light which it is wished to analyse contains the eight spectral lines whose wavelengths are respectively denoted $\lambda 1$ to $\lambda 8$ in FIG. 7.

The spectral widths of each of these lines is for example around 0.1 nanometres.

In FIG. 7, the wavelengths $\lambda$ are entered on the X axis and expressed in nanometres whilst the light powers P are entered on the Y axis and expressed in dB.

The light which it is wished to demultiplex is first of all separated in a balanced fashion, from the point of view of the light energy, by the set of Y junctions.

In this regard document (13) should be consulted.

Each of the outputs of the set of Y junctions ends at a demultiplexing Bragg grating which serves as a wideband reflector.

In FIG. 7 the respective spectral transfer functions $F(k\lambda_i)$ of the eight Bragg gratings (i=1 to 8) can be seen, each containing the spectral region of change of a line (spectral width of around 0.1 nm) of the optical spectrum of the incident light energy.

For example, the spectral width (at −3 dB) is around 3 nm for each transfer function.

The excitation spectrum SE of the transducing Bragg gratings, whose spectral width is around 50 nm, can also be seen.

The intersection of the regions delimited by two adjacent spectral transfer functions is very small.

The Bragg gratings can be photo-inscribed or photo-engraved.

In the case of the use of a photo-engraving or photo-inscribing technique, these gratings can be variable-period gratings (referred to as "chirped gratings").

The chirped gratings can be considered to be a set of gratings with adjacent wavelengths which are put in series.

In the case of the use of a photo-inscription technique, the gratings can be photo-inscribed under very high flux, so as to saturate their spectral response.

In the case of FIGS. 2A to 2D, the demultiplexing device consists of a demultiplexer with an engraved grating already mentioned above (see also documents (5), (6) and (7)).

In the example depicted, it is a case of a flat-field diffraction grating 20 provided with an input guide 22, which is coupled to the fibre FE, and output guides 24 whose number is equal to that of the spectral lines (eight in the examples considered).

Figure 2A:
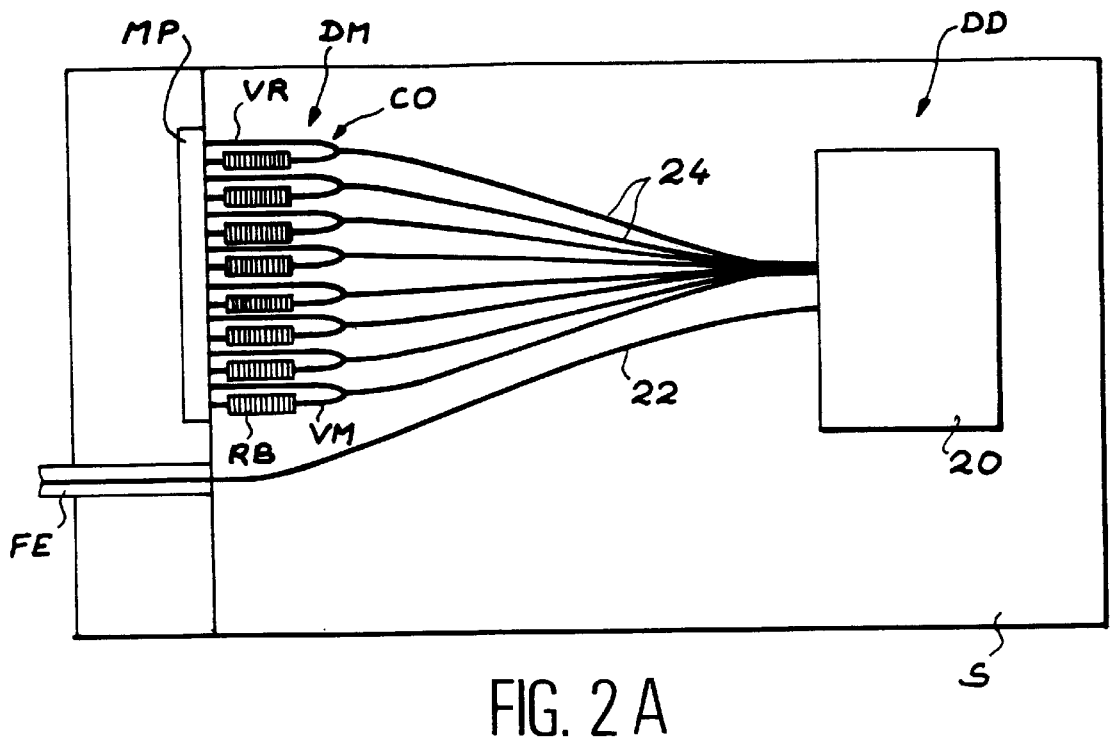
FIGS. 2A to 2D are schematic plan views of particular embodiments of the device which is the object of the invention, used in the same demultiplexing device with engraved gratings, FIGS. 2B to 2D showing this demultiplexing device only partially.
Figure 2B:
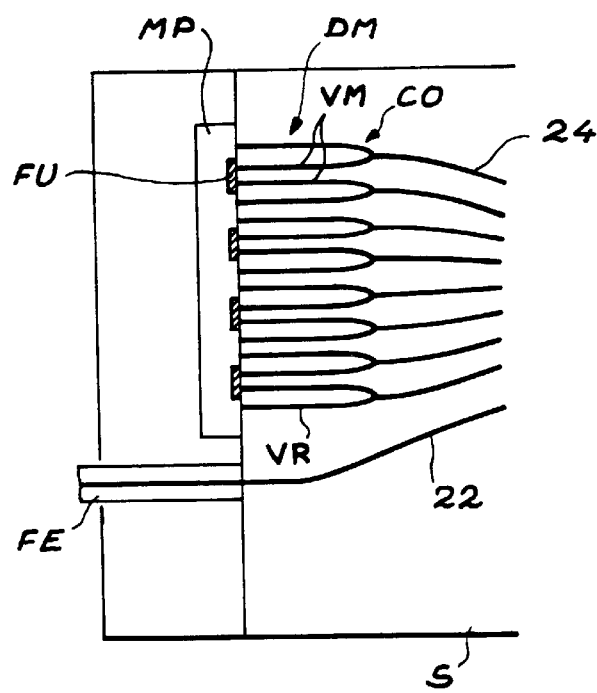
Figure 2:
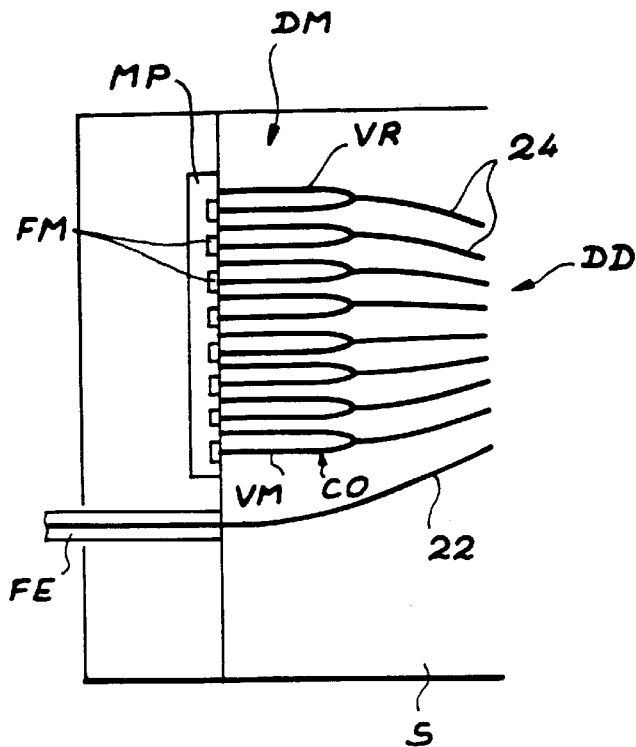
Figure 2:
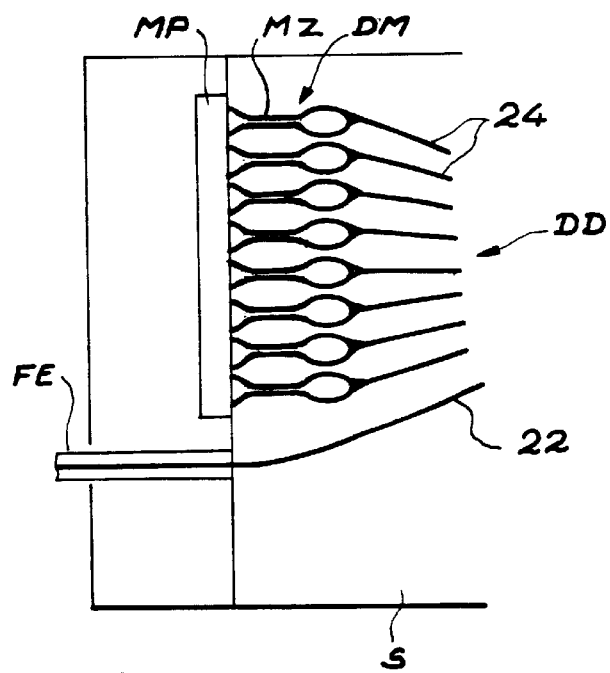

In the case of FIGS. 1A to 1D, each output guide 24 is connected to the device DM for measuring by filtering and therefore to a coupler CO (the case of FIGS. 2A to 2C) or to an interferometer MZ (the case of FIG. 2D).

In the case of FIGS. 3A to 3D, the demultiplexing device consists of a demultiplexer with a microguide grating or PHASAR 26 already mentioned above (see also documents (9), (10) and (11)).

In the example shown, it is a case of a 1×N PHASAR, with N=8, since it was considered that there were 8 spectral lines to demultiplex.

In FIGS. 3A to 3D, the input flat guide 28 and the output flat guide 30 of this PHASAR can be seen.

These flat guides 28 and 30 are connected by a set of dephasing guides 32 and the input flat guide is coupled to an input guide 34, itself coupled to the fibre FE, whilst the output flat guide is coupled to N(=8) output guides 36.

The half-wave plate 37 can also be seen, with which the set 32 is provided (by way of example, in no way limitative).

Figure 3A:
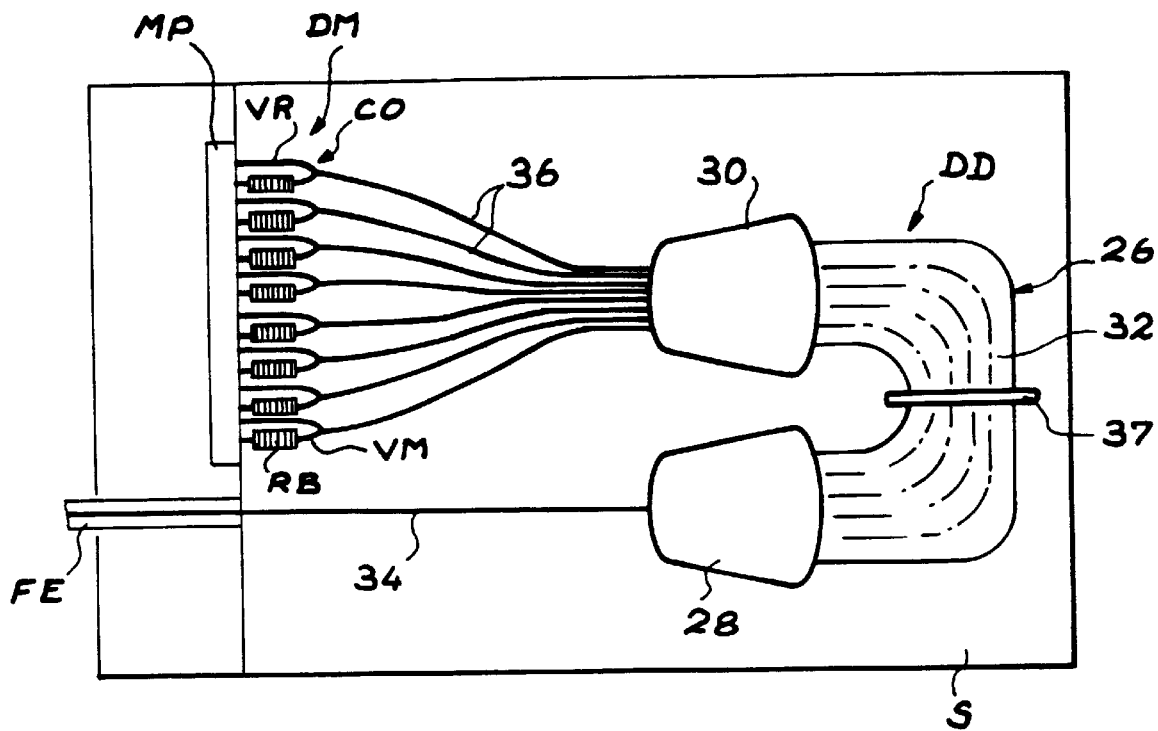
FIGS. 3A to 3D are schematic plan views of particular embodiments of the device which is the object of the invention, used in the same demultiplexing device with a phase grating, FIGS. 3B to 3D showing this demultiplexing device only partially.
Figure 3B:
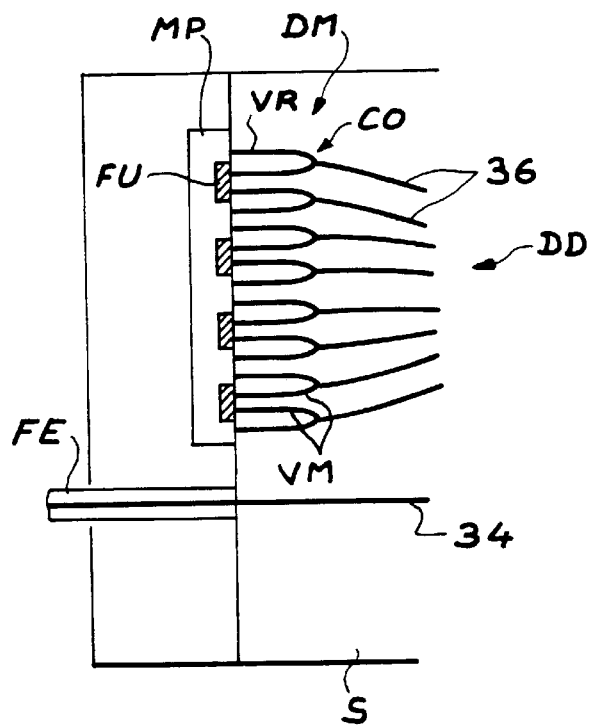
Figure 3C:
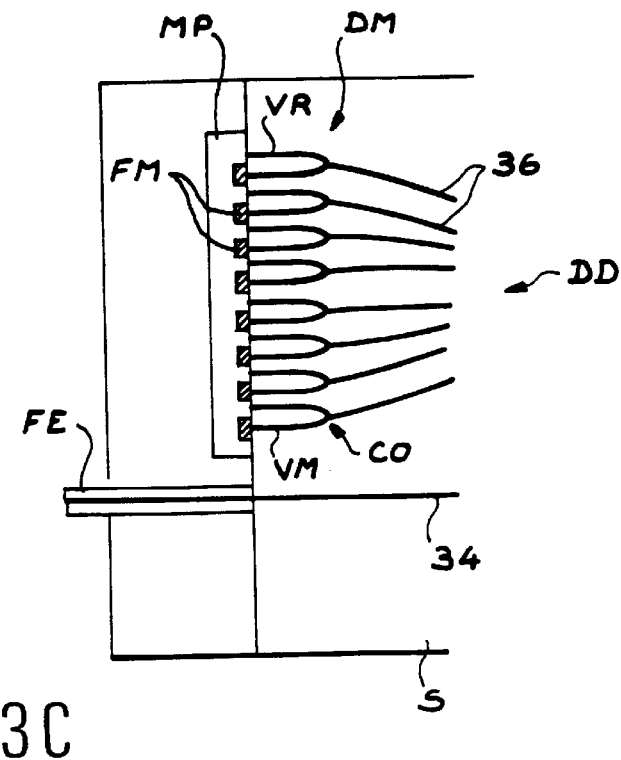
Figure 3D:
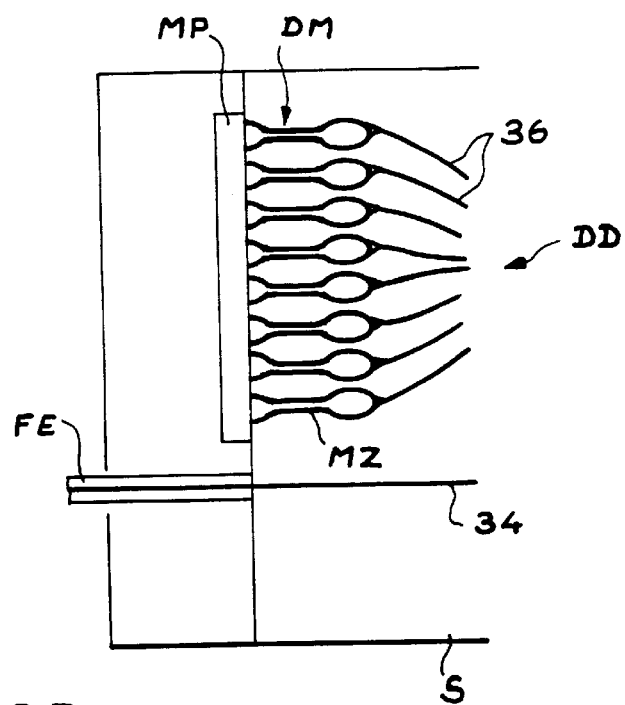

As in the case of FIGS. 1A to 1D, each output guide 36 is connected to a device DM for measuring by filtering and therefore to a coupler CO (in the case of FIGS. 3A to 3C) or to a Mach-Zehnder interferometer MZ (in the case of FIG. 3D).

The sensitivity of the measurements of the wavelengths of the spectral lines will now be considered.

The energy losses of each of the devices of FIGS. 1A to 1D can be compensated for by the fact that all the energy of each spectral line is analysed, unlike a measurement by a selective element of the Fabry-Perot type, for example, which samples each line (see document (3)).

A total optical loss of 30 dB for a device (including connection losses) will be considered.

The majority of continuous superluminescent sources typically emit a few mW over a few tens of nm of spectral width.

This corresponds to an excitation spectral density of around 1 mW/10 nm, that is to say 10 $\mu$W/Å.

Since the typical spectral width of a transducing Bragg grating is around 1.0 nm, the power returned by the external optical fibre FE is therefore approximately −20 dBm (10 $\mu$W).

Thus the power analysed at the array of photodetectors is equal to −40 dBm.

1) In the case of a filtering by chirped Bragg gratings (FIGS. 1A, 2A, 3A) the slope can be around 20% per nm, which defines a typical resolution of around a few tens of microdeformations ($\mu\epsilon$).

The conversion law is where I1 is the light intensity of the measuring channel and I2 is the light intensity of the reference channel.

2) In the case of the single filter with dielectric multilayers (FIGS. 1B, 2B, 3B), a spectral transition filter of the high-pass or low-pass type provides a slope of around 2.5% per nm.

The total spectral width for 8 transducers is approximately 3×8 nm=24 nm.

The resolution is then around a few hundredths of HE for each transducer (see document (30)).

The conversion law is identical to that which is given above for case 1).

3) In the case of FIGS. 1C, 2C, 3C, the dielectric multilayer filters can be of the Fabry-Perot type with bandpass spectral transmission, which provides a slope of approximately 20% to 25% per nm.

The deformation precision obtained on the measurement of a single transducer is then a few tens of $\mu\epsilon$.

The conversion law is identical to that given above for case 1).

4) In the case of FIGS. 1D, 2D, 3D, a Mach-Zehnder interferometer with a difference in length of arm of approximately 100 $\mu$m is characterised by a typical spectral period of 10 nm (for a wavelength belonging to the near infrared region).

On 3 nm of spectral change, the corresponding slope is approximately 20% per nm.

Thus the deformation precision is similar to that obtained with case 3), that is to say a few tens of $\mu\epsilon$.

The conversion law is this time $$T(\lambda) = \frac{I1 - I2}{I1 + I2}$$

where I1 and I2 are two intensities coming respectively from the output arms of the interferometer.

The embodiments providing the greatest sensitivities correspond to cases 1), 3) and 4).

The embodiment which is the most "flexible" with regard to spectral adjustment corresponds to case 1) whilst the most simple from a technological point of view corresponds to case 2), at the cost of a lesser measurement sensitivity.

The manufacture of a device according to the invention will now be considered.

In order to minimise the optical losses through curves, the radii of curvature of the dielectric guides of the device are typically around a few cm.

Thus the separation of the guides requires a fairly high interaction length (around 3 cm approximately for eight outputs).

Because of this, by way of example, the useful length of the device comprising a demultiplexer with Bragg gratings is approximately 7 cm for a width of 5 mm (in fact, the device in practice has a width of approximately 1 cm in order to be able to be handled) whilst the useful length and width of the devices comprising a demultiplexer with an engraved grating or a phase grating are respectively 7 cm and 4 cm.

The manufacture of a device according to the invention on a glass substrate will now be considered.

The technique of integration on such a substrate is well suited to the production of the devices of FIGS. 1A to 1D.

The technique used is that of the thermal exchange of ions of the $Na^+$, $K^+$ or $Cs^+$ type, possibly assisted by an electric field.

The principle of this technique consists in exchanging alkali ions, for example sodium ions $Na^+$, already present in the glass, with other ions, of the $Ag^+$ or $Tl^+$ type, which have the effect of locally increasing the refractive index of the glass.

This technique is well known and with regard to it documents (13) and (14) should for example be consulted.

The optical losses due to the fibre-guide and to the attenuation in the guide have been considerably reduced by virtue of the technique of buried guides.

This technique consists in diffusing a first dopant in the substrate in an electric field.

In this way guides are obtained which are characterised by almost circular doping sections and by a mode in accordance with that of a monomode fibre (there is an optimisation of the modal overlap) and which have attenuations per unit length which are much less because of the disappearance of the surface diffusion.

These attenuations are typically less than 0.1 dB/cm.

The manufacture of a device according to the invention on a silicon substrate will now be considered.

The $SiO_2$ on Si technologies (guiding layers of $SiO_2$, SiON and $Si_3N_4$) are also perfectly adapted to the production of such a device.

The techniques used in this case are based on a chemical vapour deposition denoted CVD or a flame hydrolysis deposition and reactive ion etching for producing the patterns.

With regard to vapour phase deposition, documents (15) and (16) should be consulted.

With regard to flame hydrolysis deposition, document (17) should be consulted.

The example of the technique of manufacturing guides in silica on silicon will be considered.

In this regard reference should be made to document (15).

In this case, the optical substrate is a layer of silica with sufficient thickness to isolate the light from the silicon (a thickness of 6 $\mu$m for a wavelength of 0.8 $\mu$m and of 12 $\mu$m for a wavelength of around 1.3 $\mu$m or 1.55 $\mu$m).

The guiding layer is for example a layer of silica doped with phosphorus, whose thickness is around 2 $\mu$m to 5 $\mu$m depending on the wavelength, and the covering layer, or superstrate, is equivalent to the substrate, from the point of view of the optical index, and has a thickness of around 6 $\mu$m to 10 $\mu$m.

An important advantage of optics integrated on silicon is the possibility of simultaneously etching U-shaped or V-shaped grooves for positioning the monomode optical fibres.

In this regard, documents (15), (18) and (19) should be consulted.

Another advantage of integrated optics on silicon lies in the control of the slope of the engraving flanks in order to limit parasitic reflections at the end of the optical guides, parasitic reflections which cause cross-talk.

The manufacture of a device according to the invention on a III–V semiconductor substrate (for example AsGa or InP) is similar to OIS technology. Typically, it is a case of layers of InP, InGaAsP, InP with a thickness of 1 $\mu$m obtained by molecular beam epitaxy (MBE) and etched by reactive chemical etching (RIE).

In this regard, document (33) should be consulted.

In the case of a demultiplexing device with separating junctions and Bragg gratings, it was seen that the separating junctions were preferably Y junctions.

The light arriving at a Y junction is separated equally between the two arms thereof.

Vice versa, the light appearing in only one of the two arms is only half coupled in the receiving guide, the remainder of the energy being coupled in the substrate (see document (20)).

For a demultiplexer with 8 channels, the proportion of incident energy on the array of detection photodiodes (reflected by the demultiplexing Bragg grating) is approximately 3% of the incident energy (attenuation of −15 dB).

The production of demultiplexing Bragg gratings is now considered.

As seen above, these gratings can be photo-engraved or photo-inscribed.

Chirped photo-inscribed gratings are described in documents (25) and (26).

Figure 8:
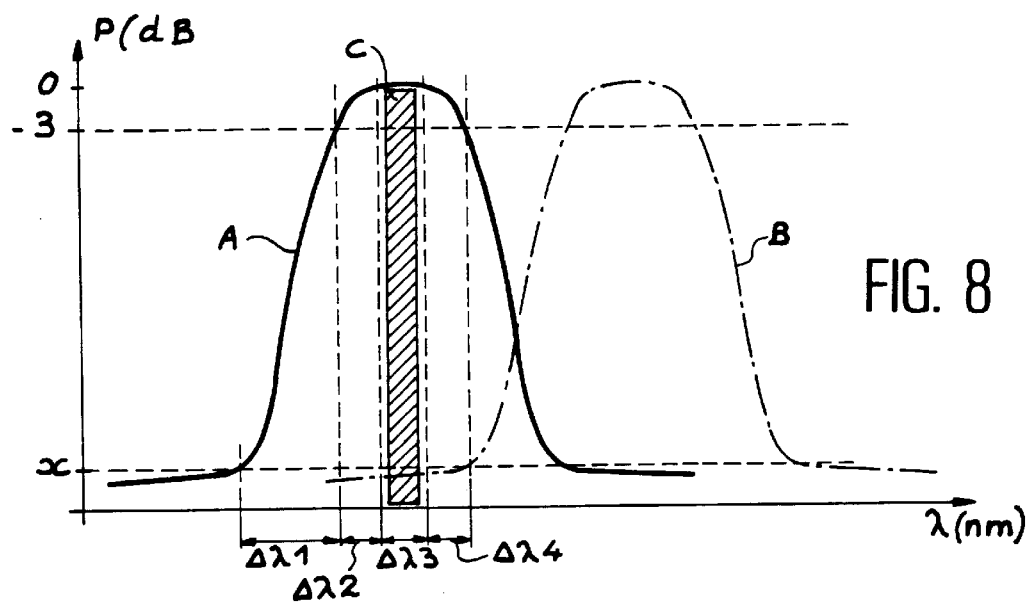
FIG. 8 depicts a standard nomogram for spectral demultiplexing.

FIG. 8 will be considered, in which the transfer function A of the Bragg grating corresponding to the line under consideration and the transfer function B of a Bragg grating adjacent to a previous one are shown.

On this nomogram, the wavelengths λ are entered on the X axis and expressed in nanometres and the light powers P are entered on the Y axis and expressed in dB.

It is also possible to see the area C of spectral change of the line under consideration (by way of example, this is equal to approximately 1 nm, which corresponds to a maximum stress of 1,000 με).

In FIG. 8, the cross-talk X is around −30 dB to −40 dB and the wavelength intervals Δλ1, Δλ2, Δλ3, Δλ4 are respectively 3 nm, 1 nm, 1 nm, 1 nm.

For each of the lines, a demultiplexing spectral width of approximately 3 nanometres (defined at −3 dB) has been chosen, taking into account a margin of accuracy of manufacture by photo-inscription, and a thermal drift of ±50° C. around ambient temperature.

The useful spectral space is then approximately 50%.

Where the measuring range is 10,000 με (that is to say 10 nm of change in wavelength), the total range is then 12 nm and the spectral space occupied is 80%.

The cross-talk depends on the adaptation to the end of the optical guides where the Bragg gratings are formed.

Typically, a cross-talk of −40 dB can be achieved by giving, to each guide carrying a Bragg grating, an end slanting with respect to the axis of this grating, in the case of technology using silicon, so that the light which is not selectively reflected by the gratings passes into the substrate on which they are formed.

In the case of the technology using glass, so that the light which is not selectively reflected passes into the substrate, microholes can be machined therein along an axis which is not perpendicular to the guide.

Two techniques can be used for producing demultiplexing Bragg gratings and measuring Bragg gratings on the flat substrate.

The first technique is photo-engraving, described in document (21).

This technique uses the variation in effective index induced along the guide by mechanical engraving of the superstrate very close to the core (over a depth of 1 μm to 2 μm).

A very thin layer of photosensitive resin (photoresist), approximately 70 nm thick, is applied to the substrate, for example by spin coating, in order to obtain a good engraving resolution.

This layer of photosensitive resin is then insolated in the visible or near ultraviolet region (by means of a 457.9 nm argon laser as disclosed in document (21)) using interference patterns coming from optical circuits similar to those used for the photo-inscription of the Bragg gratings.

In this regard, documents (22) to (28) should be consulted.

After development, the glass is engraved by reactive ion engraving, for example by means of an argon beam in an atmosphere of trifluoromethane.

A layer of alumina with a thickness of 80 nm and a higher optical index than that of silica is generally deposited on top of the engraved area, in order to increase the efficiency of diffraction of the grating by concentrating the field of the fundamental mode on the engraved area.

The second technique is photo-inscription.

In this regard, documents (22) to (28) should be consulted.

In the case of silica doped with germanium, the process of manufacturing the glass includes an annealing which gives the glass very low photosensitivity by eliminating structural defects.

The technique of hydrogenation (annealing of the glass in a hydrogen atmosphere or pressuring to several megapascals at room temperature) or the technique of flame quenching makes it possible to considerably increase the photosensitivity of the substrates of glass or silica on silicon.

In this regard, documents (22), (23) and (24) should be consulted.

The preferential technique for photo-inscription of Bragg gratings is the phase mask technique since it lends itself well to multiple inscriptions on a substrate, in accordance with traditional photolithographic methods.

The theory of this technique is described in many basic works (see for example document (12) p. 64).

For implementing it, a mask is produced which is in the form of a sheet of molten silica (for example of the type which is sold by Corning under the reference Corning 7940), on which serrations have been engraved.

These serrations are periodic, with a period $d = \lambda_B / N$ (where $\lambda_B$ represents the wavelength of the grating and N represents the effective index of the guided fundamental mode) and have a depth such that there is a phase modulation of π at the insolation wavelength, as disclosed by document (25).

The insolation laser beam can come from an ionised argon laser emitting at 488 nm, whose frequency has been doubled (inside the laser cavity), in order to emit in the ultraviolet region at 244 nm, or a YAG-Nd laser whose frequency has been quadrupled, in order to emit at 266 nm.

It is also possible to use an excimer laser of the KrF type (emitting at 249 nm).

The laser beam is then principally diffracted in two orders (−1 and 1) each representing approximately 35% of the energy, whilst the zero order (which must be reduced to a minimum in practice) represents less than 5% of the energy.

The two coherent waves coming from each order then create an interference diagram of period Λ which produces the grating of wavelength $\lambda_B = 2 \cdot N \cdot \Lambda = N \cdot d$ where N is the effective index of the guided fundamental mode.

The period of the grating is independent of the insolation wavelength (which makes the method usable with optical sources with a low coherence length, such as a KrF excimer laser).

Gratings with variable periods are advantageously obtained by a succession of several phase gratings with a constant pitch.

In this regard document (26) should be consulted.

Such phase masks are sold commercially (for example by the companies Lasiris, Northern Photonics, QSP Tech) in order to produce a single grating.

The insolation mask of the component thus consists of several of the masks distributed over the guides to be insolated.

This mask is positioned on the component and the whole (mask and component) can be moved in translation under the laser beam by micromovement means (stepping motors).

The typical length of a chirped grating is approximately 5 mm to 10 mm.

A greater flexibility of wavelength adjustment can be envisaged by applying the two-wave interferometry method described in documents (27) and (28).

According to this other method, the beam can come from a dye laser whose frequency is doubled and which is pumped by an excimer laser of the XeCl type.

In this regard, document (28) should be consulted.

This other method has the advantage of permitting the precise adjustment of Bragg tuning wavelengths without modifying the interferometer, by very slightly adjusting the insolation wavelength (from 230 nm to 255 nm approximately).

The production of the device for measuring by filtering is now considered.

In the case of chirped photo-inscribed Bragg gratings, it is a case of sloping spectral function gratings as described in document (26).

The manufacturing method is identical to that previously described with regard to the production of demultiplexing Bragg gratings.

In the case of a single filter with dielectric multilayers, in order to manufacture such a filter a layer of photoresist is deposited on the substrate, preferably by electrospray, and a mask is used for developing an uncovered area.

After deposition of the multiple dielectric layers (typically Si and $SiO_2$), the layer of photoresist is dissolved, entraining the residual deposit (the lift-off technique).

With regard to filters with dielectric multilayers different from each other, in the same way as with demultiplexing Bragg gratings, the total spectral width is approximately three times the useful width in order to take account of the thermal drift of the spectral function.

The manufacturing method is similar to that described for the single filter with dielectric multilayers and repeated as many times as there are measuring channels.

With regard to Mach-Zehnder interferometers, in the same way, the spectral period of such an interferometer is adjusted in order to guarantee a spectral width approximately three times the useful width.

Around 1,300 nanometres, the spectral period is approximately 11 nanometres for an imbalance in length of 50 µm between the two arms of each interferometer.

Advantageously, an interferometer consists of a Y junction and a balance coupler (3 dB), making it possible to separate the light energy on two occasions without optical losses, unlike two Y junctions.

Examples of application of the device which is the object of the invention will now be considered.

Such a device makes it possible to demultiplex several spectral lines and to convert their wavelength differences into several electrical signals.

Such a device can be produced on a single substrate (by connecting the demultiplexing device to the device for measuring by filtering by means of guides, preferably monomode (see FIGS. 1A to 3D).

Figure 9:
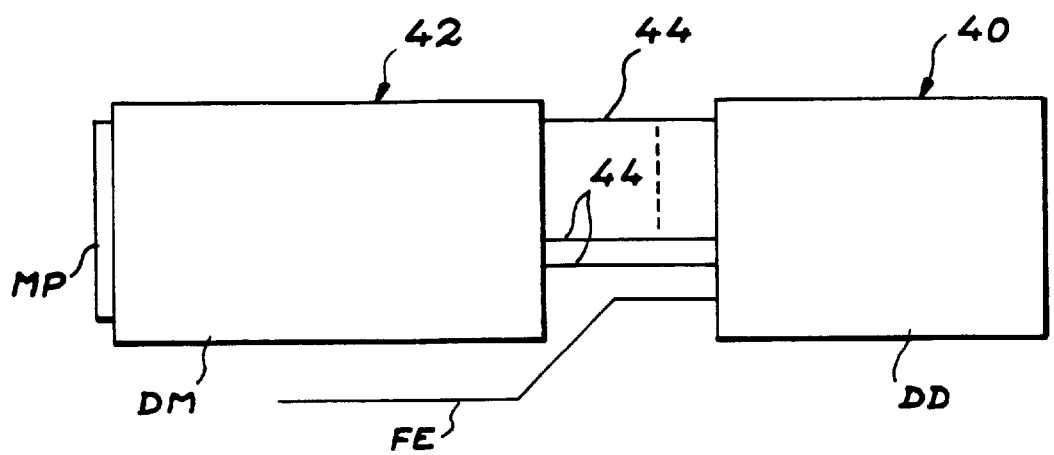
FIG. 9 is a schematic plan view of another particular embodiment of the device which is the object of the invention.

However, such a device can comprise two substrates as illustrated schematically by FIG. 9.

In this FIG. 9 a first substrate 40 can be seen, on which there is produced the demultiplexing device DD and a second substrate 42 on which there is produced the device for measuring by filtering DM.

These substrates 40 and 42 are optically connected to each other by means of connecting optical fibres 44 (8 fibres where there are 8 spectral lines to be demultiplexed).

There can also be seen in FIG. 9 the external optical fibre at FE, which brings the spectral rays to be demultiplexed to the demultiplexing device formed on the substrate 40.

Figure 10:
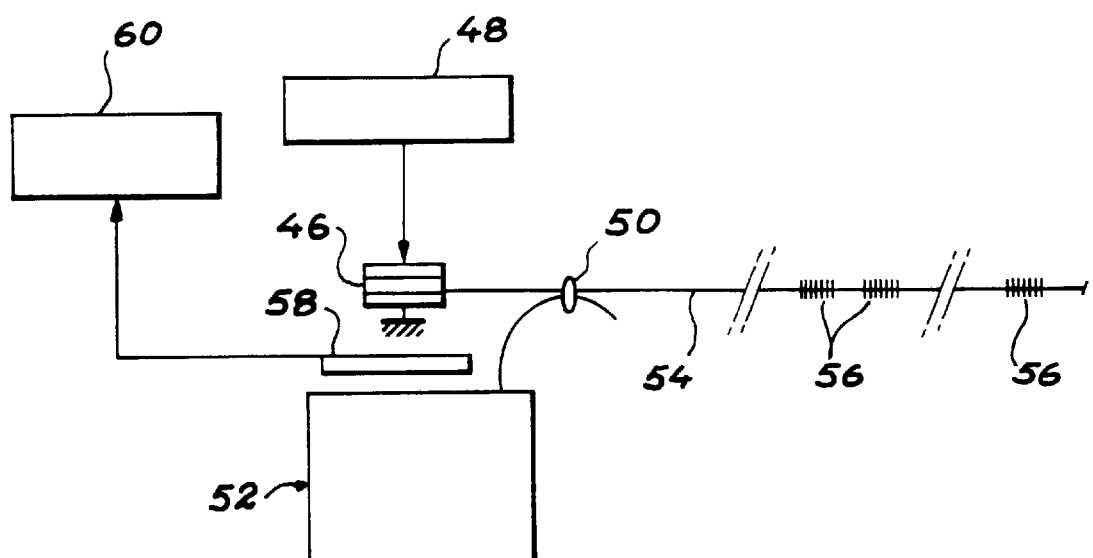
FIG. 10 is a schematic view of a microsystem for measuring deformations or temperatures, using a device in accordance with the invention.

FIG. 10 illustrates schematically an optical microsystem intended to measure deformations or temperatures by means of transducers with photo-inscribed Bragg gratings.

This microsystem comprises an optical source 46 with a broad spectral band (which can be a superfluorescent source with fibre doped with erbium or a superluminescent diode).

This source 46 is fed with electric current by suitable means 48.

The microsystem also comprises a balanced coupler with four channels 50 (50% of transmission on the two output channels).

The source 46 is connected to an input arm of the coupler 50.

The other input of this coupler 50 is connected to a device according to the invention 52.

One of the two output arms of the coupler 50 is left free whilst the other output arm of this coupler 50 is connected to one of the ends of a sensitive monomode optical fibre 54 on which several transducing Bragg gratings 56 have been photo-inscribed.

The other end of the fibre 54 is split on a slant.

It should be noted that the optical spectrum of a superluminescent diode has a Gaussian appearance, with a typical spectral width of 30 nanometres to 50 nanometres approximately.

There can also be seen in FIG. 10 an array of photodiodes 58 which is coupled to the device for measuring by filtering belonging to the device 52 and which forms part of this device 52.

This array of photodiodes 58 is electrically connected to electronic processing means 60 for calculating the wavelengths of the spectral lines corresponding to the transducers 54.

It should be stated that a flat substrate can be used, made of silicon or III–V semiconductor sufficiently large to integrate thereon not only the device according to the invention 52 (including the array 58) but also a superluminescent diode as well as the coupler 50.

The multilayer filters and the Bragg gratings which the device 52 can include are characterised by a thermal drift of around 0.01 nm/° C. identical to the thermal drift of a transducing Bragg grating.

Thus, if all the Bragg gratings (transducing gratings photo-inscribed on the sensitive fibre and gratings of the device according to the invention) are at the same temperature, the spectral shifts compensate for each other exactly and no temperature correction is necessary.

If however the stress transducing Bragg gratings and the device according to the invention are not at the same temperature, it is possible to provide a temperature reference grating not subject to the stress.

The microsystem of FIG. 10 applies to the monitoring, in real time, with a large passband (100 kHz), of several stresses or several pressures applied to the sensitive fibre incorporated in a structure made, for example, of composite material.

This microsystem can also be used to make temperature measurements in real time.

It can also be used in telecommunications for demultiplexing several channels and measuring an item of information coded in terms of wavelength.

Another example of an application consists of the connection of a device according to the invention to an array of laser sensors as described in document (32).

This application is similar to that described with reference to FIG. 10 but replacing each Bragg transducer with a laser sensor consisting of an optical fibre doped with rare-earth ions (typically $Er^{3+}$ ions) and two Bragg gratings where one is the transducer and the other closes the laser cavity.

Another example of an application is the demultiplexing and measuring of several wavelengths (spectrophotometry application) for telecommunications modulated in terms of wavelength, for example.

The robust and preferably integrated character (a few centimetres breadth over a few millimetres depth) of this device makes it particularly suitable for being included in a microsystem which can be incorporated in a structure to be monitored (between two layers of composite material, for example).

A device according to the invention (whatever the type of demultiplexing used) can be made very little dependent on the polarisation of the light analysed, which constitutes an additional advantage in terms of simplicity in use for the users (since it is then not necessary to use polarisation maintenance fibres).

In addition, where the demultiplexing uses Y junctions and photo-inscribed Bragg gratings, the great "flexibility" in manufacture of the device makes it particularly attractive for instrumentation by means of multisector sensors, because of easy adjustment of the Bragg tuning wavelengths of the photo-inscribed gratings and because the energy separation behaviour of the Y junction is independent of the wavelengths used.

Returning to FIG. 1A, the light coming, for example, from sensors present on a measuring line and brought by the optical fibre FE passes through an energy separator which supplies, by way of example, 8 signals with the same spectral characteristic as each of its outputs. Each output corresponds to an arm of a wavelength separating junction operating in reflection and sending back the filtered energy in a guide 14. On each of these junctions there is photo-inscribed a Bragg grating 12 which separates a wavelength region separate from the others (see FIG. 7) and fulfils the function of spectral demultiplexing for each of the sensors present on the measuring line. This separating junction can be produced in two ways.

Figure 11:
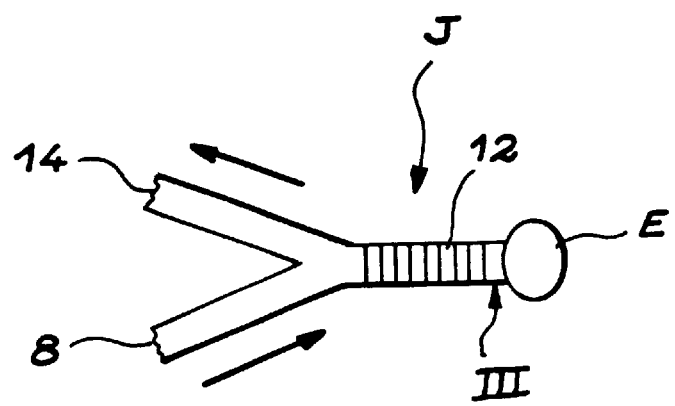
FIGS. 11 and 12 illustrate schematically two possibilities of demultiplexing.

The first solution uses a Y junction with a Bragg grating 12 (advantageously at 100% reflection) photo-inscribed on the input branch (see FIG. 11 where the junction has the reference J). This solution is advantageous in that the guidance properties of the Y junctions are very little sensitive to the polarisation and wavelength of the light. Thus a single mask can be produced in order to obtain the component, which makes the manufacturing very flexible since only the wavelengths of the Bragg gratings are adjusted in order to produce the demultiplexer. On the other hand, this Y junction imposes an optical loss of 6 dB during the filtering operation (that is to say the signal goes from the output 8 to the guide 14).

Figure 12:
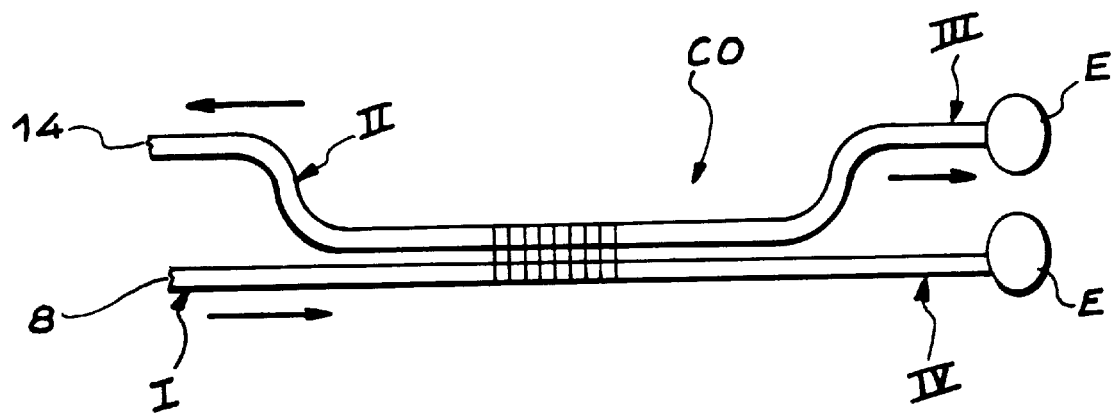

A second solution enabling this drawback to be eliminated consists of simultaneously photo-inscribing each Bragg grating 12 (advantageously with 100% reflection) on the two arms of a coupler CO in order to form a grating-assisted coupler (see FIG. 12). Such a coupler is advantageously chosen so as to have a low coupling constant C so that a single beat is observed over the coupling length $L_c$ (that is to say $C.L_c=\pi/2$) in order to minimise its wavelength and polarisation dependency. The principle of a grating-assisted coupler is as follows. The coupling length, the coupling interval and the characteristics of the coupler guides are chosen so as to obtain a total transfer of energy from the port I to the coupled port III, that is to say 100%. In the presence of a grating (operating in reflection) photo-inscribed on the two arms, the wavelengths reflected by the Bragg grating pass through the coupler in the opposite direction and are reflected at the port II (as if they came from the port IV, symmetrical with the port II). There is then "extraction" of the signals whose wavelengths correspond to the character-istic wavelength of the photo-inscribed Bragg grating. This behaviour is described (by way of example) in document (34).

In both cases (Y junction or coupler 100% assisted by Bragg grating), the ends of the guides III (FIG. 11) and III and IV (FIG. 12) are pierced on a slant (which is represented by ovals E in FIGS. 11 and 12) in order to eliminate the Fresnel reflections, which are sources of cross-talk.

The documents cited in the present description are as follows:

(1) W. W. Morey, UNITED TECHNOLOGY CORPORATION (USA) Distributed multiplexed optical fiber Bragg grating sensor arrangement—see also U.S. Pat. No. 4,996,419

(2) D. R. Lyons and S. M. Reich, GRUMMAN AEROSPACE CORPORATION (USA) Optical electronic multiplexing reflection sensor system—see also U.S. Pat. No. 5,191,458

(3) P. Ferdinand et al, Mine Operating Accurate Stability Control with optical fiber sensing and Bragg grating technology: the BRITE-EURAM STABILOS Project, OFS'94, Oct. 11–13, 1994, Glasgow—see also J. Lightwave Technol., Vol. 13, No. 7, 1995, pp. 1303–1313

(4) J. R. Dunphy and K. P. Falkowich, UNITED TECHNOLOGY CORPORATION (USA) Multiplexed Bragg grating sensors—see also U.S. Pat. No. 5,426,297

(5) P. C. Clemens, G. Heise, R. Marx, H. Michel, A. Reichelt and H. W. Schneider, 8-Channel optical demultiplexer realized as $SiO_2/Si$ flat-field spectrograph, IEEE Phot. Tech. Lett., Vol. 6, No. 9, 1994, pp. 1109–1111

(6) G. Grand, G. Palumbo, A. Fournier and P. Labeye, Blazed grating with highly vertical profile in silica on silicon—Application to multiplexing for optical communications, Journees Nationales d'Optique Guidee, Besancon, 1994, pp. 4–6

(7) P. Gidon, J. P. Jadot and S. Valette, Multiplexer-demultiplexer used in an elliptical concave grating and produced in integrated optics EP-A-0275795 —see also U.S. Pat. No. 4,786,133

(8) B. H. Verbeek, C. H. Henry, N. A. Olsson, N. A. Orlowsky, R. F. Kazarinov and B. H. Johnson, Integrated four-channel Mach-Zehnder Multi/demultiplexer fabricated with phosphorus doped $SiO_2$ waveguides on Si, J. Of Lightwave Technol., Vol. 6, No. 6, 1988, pp. 1011–1015

(9) H. Takahashi, K. Oda, H. Toba and Y. Inoue, Transmission characteristics of arrayed waveguide N×N wavelength multiplexer, J. of Lightwave Technol., Vol. 13, No. 3, 1995, pp. 447–455

(10) K. Okamoto, K. Moriwaki and S. Suzuki, Fabrication of 64×64 arrayed-waveguide grating multiplexer on silicon, Electron. Lett., Vol. 31, No. 3, 1995, pp. 184–186

(11) V. Delisle, G. Grand, A. Fournier and P. Mottier, Reduced-size low-crosstalk PECVD silica PHASAR using widened continuous bends, $8^{th}$ European conference on integrated optics, ECIO'97, Stockholm, 1997

(12) J. W. Goodman, Introduction to Fourier Optics, McGraw-Hill

(13) S. Honkanen, Ion-exchanged glass waveguide devices for optical communications, Glass integrated optics and optical fiber devices, S. Iraj Najafi Ed., SPIE Vol CR53, 1994, pp. 159–179

(14) L. Roβ, Integrated optical components in substrate glasses, Glastech. Ber., Vol. 62, 1989, pp. 285–297

(15) S. Valette et al., Si-based Integrated Optics Technologies, Solid State Tech., 1989, pp. 69–74

(16) S. Valette, S. Renard, J. P. Jadot, P. Gidon and C. Erbeia, Silicon-based Integrated Optics Technology for Optical Sensor Applications, Sensors and Act. A, 1990, pp. 1087–1091

(17) Y. Ohmori, Passive and active silica waveguides on silicon, Proc. ECOC 93, Montreux, pp. 19–26

(18) W. Hunziker et al., Self-aligned flip-chip OEIC packaging technologies, Proc. ECOC 93, Montreux, pp. 84–91

(19) G. Grand et al., New method for low-cost and efficient optical connection between single-mode fibres and silica guides, Electron. Lett., Vol. 27, No. 1, 1991, pp. 16–17

(20) M. Izutsu, Y. Nakai and T. Sueta, Operation mechanism of the single-mode optical waveguide Y junction, Opt. Lett. Vol. 7, No. 3, 1982, pp. 136–138

(21) C. J. Rowe, I. Bennion and D. C. J. Reid, High-Reflectivity surface-relief gratings in single-mode optical fibres, IEE Proc. J., Vol. 134, No. 3, 1987, pp. 197–202

(22) B. J. Ainslie, G. D. Maxwell and D. L. Williams, Photosensitive glass integrated optical devices, Glass integrated optics and optical fiber devices, S. Iraj Najafi ed., SPIE Vol CR53, 1994, pp. 235–249

(23) G. D. Maxwell, R. Kashyap and B. J. Ainslie, UV written 1.5 μm reflection filters in single mode planar silica guides, Electron. Lett., Vol. 28, No. 22, 1992, p. 2107–2108

(24) K. O. Hill, F. Bilodeau, B. Malo, J. Albert, D. C. Johnson, Y. Hibino, M. Abe and M. Kawachi, Photosensitivity of optical fibre and silica on silica/silicon waveguides, Opt. Lett., Vol. 18, No. 12, 1993, pp. 953–955

(25) K. O. Hill, B. Malo, F. Bilodeau, D. C. Johnson and J. Albert, Bragg gratings fabricated in monomode photosensitive optical fiber by UV exposure through a phase mask, Appl. Phys. Lett., Vol. 62, No. 10, 1993, pp. 1035–1037

(26) R. Kashyap, P. F. McKee, R. J. Campbell and D. L. Williams, Novel method of producing all fibre photo-induced chirped gratings, Electron. Lett., Vol. 30, No. 12, 1994, pp. 996–997

(27) M. C. Farries, K. Sugden, D. C. J. Reid, I. Bennion, A. Molony and M. J. Goodwin, Very broad reflection bandwidth (44 nm) chirped fibre gratings and narrow bandpass filters produced by the use of an amplitude mask, Electron. Lett., Vol. 30, No. 11, 1994, pp. 891–892

(28) G. Meltz, W. W. Morey and W. H Glenn, Formation of Bragg gratings in optical fibers by a transverse holographic method, Opt. Lett., Vol. 14, No. 15, 1989, pp. 823–825

(29) R. Kashyap, G. D. Maxwell and B. J. Ainslie, Laser trimmed four-port bandpass filter fabricated in single-mode photosensitive Ge-doped planar waveguide, IEEE Photon. Technol. Lett., Vol. 5, 1993, pp. 191–194

(30) S. M. Melle, K. Liu and R. M. Measures, A passive wavelength demodulation system for guided-wave Bragg grating sensors, IEEE Phot. Tech. Lett., Vol. 4, No. 5, 1992, pp. 516–518

(31) M. A. Davis and A. D. Kersey, All-fibre Bragg grating strain-sensor demodulation technique using a wavelength division coupler, Electron. Lett., Vol. 30, No. 1, 1994, pp. 75–77

(32) G. A. Ball, W. W. Morey and P. K. Chao, Single and multipoint fiber laser sensors, IEEE Phot. Tech. Lett., Vol. 5, No. 2, 1993, pp. 267–270

(33) R. Mestric, M. Renaud, B. Martin and F. Gaborit, Up to 16 Channel Phased-array wavelength demultiplexers on InP with 20 dB crosstalk, Proc. ECIO, Stockholm 1997, pp. 264–267

(34) Ingolf Baumann et al., Compact all-fiber add-drop multiplexer using fiber Bragg gratings, IEEE Phot. Tech. Lett., Vol. 8, No. 10, 1996, pp. 1331–1333.

What is claimed is:

1. A device for reading spectral lines which are contained in an optical spectrum and are able to fluctuate respectively in given spectral regions, this device comprising:

a device for demultiplexing these spectral lines in terms of wavelength, this demultiplexing device having an input intended to receive the optical spectrum and outputs intended to supply respectively the demultiplexed spectral lines;

a device for measuring, by filtering, the respective wavelengths of the demultiplexed spectral lines, comprising, for each of these lines, a measuring channel provided with a filter and a reference channel; and means of photodetection, for each spectral line, of the light intensities respectively transmitted by the corresponding measuring and reference channels, so as to be able to determine the wavelength of this line by calculating the ratio of the intensities thus detected.

2. A device as claimed in claim 1, wherein the demultiplexing device is an engraved grating demultiplexing device.

3. A device as claimed in claim 1, wherein the demultiplexing device is a microguide network demultiplexing device.

4. A device as claimed in claim 1, wherein the demultiplexing device comprises:

an energy separator, having an input, which is intended to receive the optical spectrum, and a plurality of outputs which are capable of supplying respectively fractions of the light energy of the optical spectrum; and a plurality of wavelength-selective light reflectors which are respectively connected to the outputs, each wavelength-selective light reflector having a wavelength passband which contains the spectral region associated with one of the lines and therefore reflecting only this line, each selective reflector being connected to an optical wave guide intended to propagate the line reflected by, this reflector.

5. A device as claimed in claim 4, wherein the energy separator is a set of cascaded separating junctions.

6. A device as claimed in claim 4, wherein the selective reflectors comprise Bragg gratings.

7. A device as claimed in claim 6, wherein the Bragg gratings are photo-inscribed or photo-engraved and are variable-period or fixed-period networks with a maximum reflectivity and a spectral response broadened by very high flux photo-inscription.

8. A device as claimed in claim 1, wherein the filter of each measuring channel is a variable-period Bragg grating.

9. A device as claimed in claim 1, wherein the filters respectively associated with the measuring channels are dielectric multilayer filters different from one another.

10. A device as claimed in claim 1, wherein the filters respectively associated with the measuring channels are dielectric multilayer filters identical to one another.

11. A device as claim in claim 1, wherein the filter of each measuring channel is a Mach-Zehnder interferometer.

12. A device as claimed in claim 1, wherein the demultiplexing device and the device for measuring by filtering are respectively integrated on two substrates which are connected by means of optical fibers intended to transmit the demultiplexed lines from the demultiplexing device to the device for measuring by filtering.

13. A device as claimed in claim 1, wherein the demultiplexing device and the device for measuring by filtering are integrated on one and the same substrate.

14. A device as claimed in claim 12, wherein substrate is made of glass or silicon or III–V semiconductor.

15. A device as claimed in claim 1, wherein the demultiplexing device, the device for measuring by filtering and photodetection means are integrated on one and the same substrate made of silicon or III–V semiconductor.

16. A device as claimed in claim 1, also comprising an optical fibre which is optically coupled to the input of the demultiplexing device and which is intended to convey the optical spectrum to this input.

17. A device as claimed in claim 13, wherein each substrate is made of glass or silicon or III–V semiconductor.

* * * * *